(12) United States Patent
Frostberg et al.

(10) Patent No.: US 9,713,772 B2
(45) Date of Patent: Jul. 25, 2017

(54) CONTROLLING A DISPLAY OF A COMPUTER DEVICE

(71) Applicant: KING.COM LIMITED, St. Julians, MT (US)

(72) Inventors: Daniel Frostberg, Stockholm (SE); Nils von Segebaden, Stockholm (SE)

(73) Assignee: KING.COM LIMITED, St. Julians (MT)

( * ) Notice: Subject to any disclaimer, the term of this patent is extended or adjusted under 35 U.S.C. 154(b) by 338 days.

(21) Appl. No.: 14/501,711

(22) Filed: Sep. 30, 2014

(65) Prior Publication Data

US 2016/0089602 A1    Mar. 31, 2016

(51) Int. Cl.
| | | |
|---|---|---|
| *A63F 13/00* | (2014.01) | |
| *A63F 9/06* | (2006.01) | |
| *A63F 13/537* | (2014.01) | |
| *A63F 13/822* | (2014.01) | |
| *A63F 13/56* | (2014.01) | |
| *A63F 13/577* | (2014.01) | |
| *A63F 13/426* | (2014.01) | |

(Continued)

(52) U.S. Cl.
CPC .......... *A63F 13/537* (2014.09); *A63F 9/0612* (2013.01); *A63F 13/2145* (2014.09); *A63F 13/426* (2014.09); *A63F 13/56* (2014.09); *A63F 13/577* (2014.09); *A63F 13/80* (2014.09); *A63F 13/822* (2014.09); *A63F 2300/807* (2013.01)

(58) Field of Classification Search
CPC ................................ A63F 13/56; A63F 9/0612
See application file for complete search history.

(56) References Cited

U.S. PATENT DOCUMENTS

| | | | | |
|---|---|---|---|---|
| 7,396,279 B2 * | 7/2008 | Berman | ............... | G07F 17/3244 463/16 |
| 8,366,538 B1 * | 2/2013 | Saunders | ............... | G07F 17/326 463/11 |
| 9,373,216 B2 * | 6/2016 | Trainor | ............... | G07F 17/3213 |

(Continued)

FOREIGN PATENT DOCUMENTS

WO    2014/140144 A1    9/2014

OTHER PUBLICATIONS

"Beginner's Guide to Earning High Scores on Bejeweled Blitz on Facebook", by Benjamin Sell. Last updated May 25, 2012. Source: http://www.gameyum.com/bejeweledblitz/45154onfacebookbeginnersguidetoplayingandgettingahighscore/.*

(Continued)

*Primary Examiner* — Steven J Hylinski
(74) *Attorney, Agent, or Firm* — Saul Ewing LLP

(57) ABSTRACT

A computer implemented method of controlling a display of a computer device comprising: rendering on the display a game board having selectable game objects and detecting a user input to select a game object to cause the game object to move in a direction. When a selected game object is moved to an adjacent new tile location, the game object at that tile location is swapped with the selected game object. Match data for the selected game object is generated indicating whether the move results in at least three game objects of the same characteristic occupying adjacent tile locations in the game board, and, if so, the move is implemented and an animation of the move is rendered, wherein the selected game object slides in the direction up to a blocking condition which prevents further movement.

23 Claims, 29 Drawing Sheets

(51) Int. Cl.
*A63F 13/2145* (2014.01)
*A63F 13/80* (2014.01)

(56) References Cited

U.S. PATENT DOCUMENTS

| | | | |
|---|---|---|---|
| 2003/0151195 A1* | 8/2003 | Porter | A63F 9/12 273/153 R |
| 2003/0190947 A1* | 10/2003 | Baerlocher | G07F 17/34 463/20 |
| 2003/0190948 A1* | 10/2003 | Baerlocher | G07F 17/34 463/20 |
| 2004/0033829 A1* | 2/2004 | Pacey | G07F 17/3265 463/20 |
| 2013/0331162 A1* | 12/2013 | Krivicich | G06F 3/04812 463/10 |
| 2014/0087827 A1* | 3/2014 | Nicely | G07F 17/3267 463/20 |
| 2014/0171166 A1 | 6/2014 | Merari | |
| 2014/0235338 A1 | 8/2014 | Hansson et al. | |

OTHER PUBLICATIONS

"Bejeweled Blitz Wiki Guide", by BBjun28, published Oct. 4, 2012. Source: http://gamesdreams.com/showthread.php?15174BejeweledBlitzWikiguide.*

"Candy Crush Cheats—Special Candies and Matching" Published May 23, 2013. Source http://candycrush-cheats.com/special-candies/.*

"Depth in one Minute—A conversation about Bejeweled Blitz", by Jesper Juul and Rasmus Keldorff. Published 2010. Source: https://www.jesperjuul.net/text/depthinoneminute/.*

"How to Play Bejeweled Blitz—The Ultimate Guide", last updated Dec. 4, 2012. Source: http://hubpages.com/gameshobbies/bejeweledblitz2.*

International Search Report, dated Dec. 22, 2015, and Written Opinion, issued in corresponding International Application No. PCT/EP2015/072617.

\* cited by examiner

CONTROLLING A DISPLAY OF A COMPUTER DEVICE

FIELD OF THE INVENTION

The disclosure relates to controlling the display of a computer device.

BACKGROUND OF THE INVENTION

One technical area where there are particular challenges in controlling the display of a computer device is in the design of computer-implemented games. Not only is there a requirement to create fun and compelling games, these games need to be delivered to a player in a seamless and engaging fashion, while adhering to complex game rules.

Gameplay should be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment.

A 'match-3 game' is a type of casual puzzle game where the player is required to find patterns on a seemingly chaotic board. The player then has to match three or more of the same type of game element on the game board and those matched elements will then disappear.

One type of match-3 games are the so-called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so-called 'shooter' games where the player launches for instance a ball or bubble on to the game board tying to aim at groups of similar game elements already on the game board. If the launched ball hits or forms a group of more than 3 similar game elements then that group of game elements are removed from the game board. In a typical shooter game the physics of the game board being that the game pieces are falling downwards on the board.

This patent specification describes not only various ideas and functions, but also their creative expression A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

The present application is directed to controlling the display of a computer device to deliver functions of a new type of match-3 game, in which players can slide game objects past each other to create line combinations of three or more. A sliding match-3 game as described herein presents particular technical challenges because matches are acknowledged in any direction on a game board, and not just in the direction that a game object is moving (or sliding). These challenges are addressed by described embodiments of the present invention.

One aspect of the invention provides a method of controlling a display of a computer device comprising: rendering on the display a game board having a plurality of selectable game objects having respective characteristics, each at a respective tile location in an array; detecting a user input to select a game object to cause the game object to move in a direction, wherein when a game object is moved to an adjacent new tile location, the game object at that tile location is swapped with the selected game object; generating match data for the selected game object if moved in that direction, the match data indicating whether the move results, at any potential new tile location of the selected game object or swapped objects resulting from the move, in at least three game objects of the same characteristic occupying adjacent tile locations in the game board, and, if so, implementing the move and rendering an animation of the move on the display, wherein the selected game object slides in the direction up to a blocking condition which prevents further movement.

In some embodiments of the present invention which are described herein, the game objects are referred to as 'plushies'. A match check is performed when a plushie has actually changed its position, that is when a move has been implemented and the plushie is "sliding". Matches of more than three game objects of the same characteristics are acknowledged by removal of those game objects from the rendered image of the game board, and from the data structure representing the game board itself. In addition, embodiments of the present invention provide a match check to test what would happen if a plushie were to slide in the direction indicated by a user. Only valid moves will be implemented, and in order for a move to be valid at least one match would need to occur. Tile data is stored in a data structure in a memory wherein the tile data identifies the characteristics of each game object at a respective tile location represented in the data structure, such as a matrix or grid. In the embodiments of the invention, the grid is three-dimensional. That is, two dimensions represent the two dimensions of the plane of the game board, and a third dimension provides multiple object layers, each holding data managing a different function of the game.

The characteristic of a game object can be its colour. In that case, the colours of game objects in the data structure are copied into a "colour grid", and the potential new position of the plushie represents a starting point of a check for matches. The check is performed by detecting colour matches in and around that position. The characteristic of a game object can be indicated by one or a set of characteristics identifiers, such as a colour identifier. A grid of characteristic identifiers can be used to detect matches.

This check is carried out when a move is actually implemented to acknowledge all matches which occur as the plushie slides. It is also implemented when a player tries to make a move (switch). In that case, an algorithm implemented in game code executed by a processor performs a match check for each position that the plushie would pass and all reversing moves (swaps) of the plushies that it passes. If any match is detected, the algorithm stops and the move will start (actually be implemented). When a move is actually performed, the grid might have changed due to a refill or some of the moves, so there is no certainty that the anticipated match will occur. Therefore, when the move is actually implemented, the check is carried out again for "real" matches.

Aspects of the invention also provide a computer device in which the method is implemented, and a computer readable medium holding instructions for implementing the method. The code can be executed on a client device to control a display of the device. Parts or all of the code can be executed remotely, for example at a server, and generate data which is transmitted to a client device for controlling a display of the client device.

DESCRIPTION OF THE DRAWINGS

Embodiments of the invention will now be described by way of the accompanying drawings in which.

DETAILED DESCRIPTION OF THE INVENTION

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing form the scope of the present invention.

Figure 6:
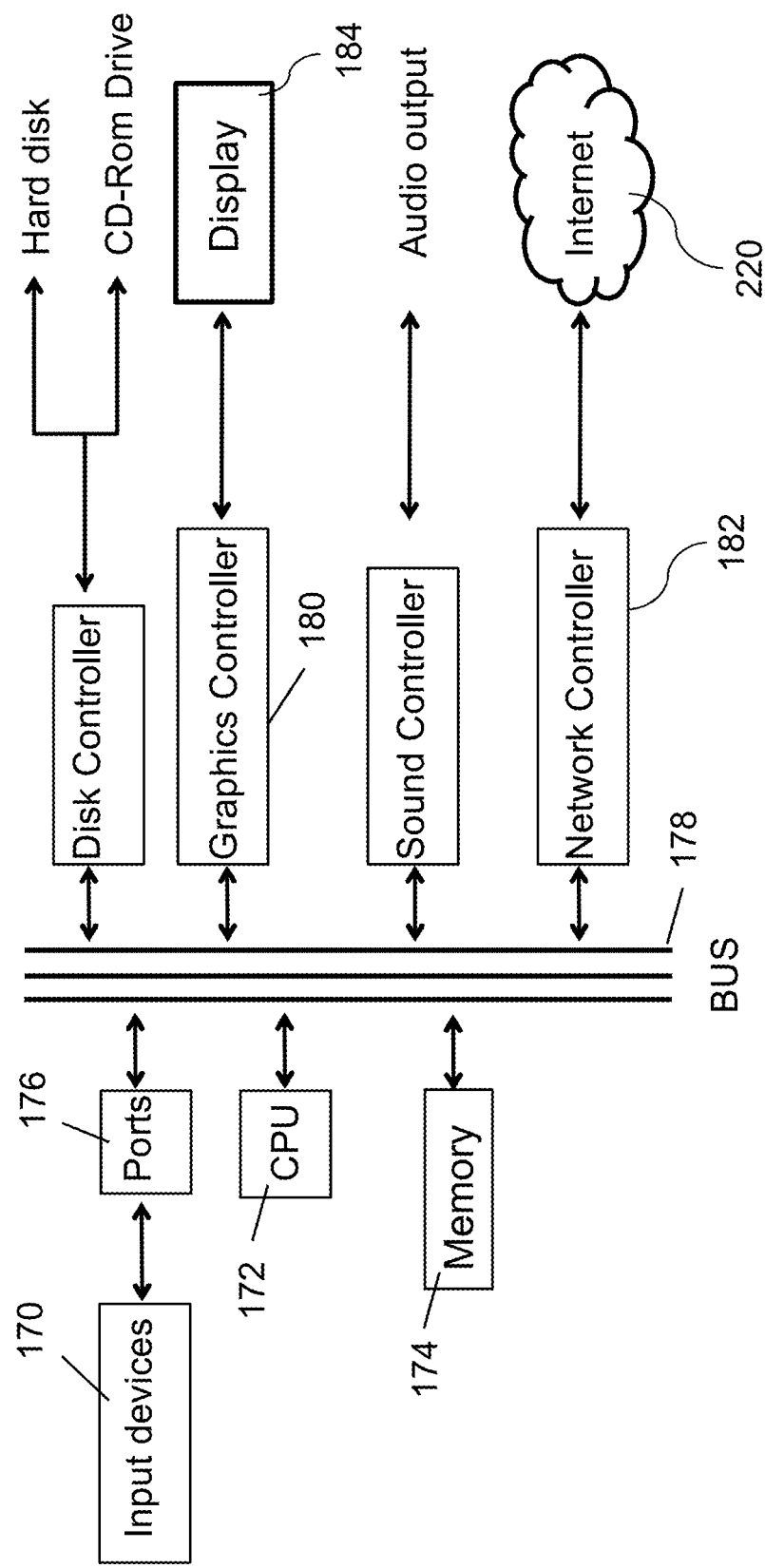
FIG. 6 is a schematic illustration of a computer device.

FIG. 6 shows a schematic picture of a computing device, containing a Central Processing Unit 172 and Random Access Memory 174. The CPU 172 acts according to input given from input devices 170 such as a keyboard, mouse or touchscreen. Computer buses 178 are used to communicate, both between input devices 170 and the CPU 172, but also between different controllers within the computer device, such as a graphics controller 180 and a network controller 182. These controllers in turn communicate with external devices, such as a display 184 for video output with which the graphics controller 180 communicates to present the game board, and the network controller 182 communicates with for instance the Internet 122, through wireless or wired connections. A user can interact with the computing device through input devices 170 such as a pointing device (e.g. mouse) and a keyboard.

Figure 7:
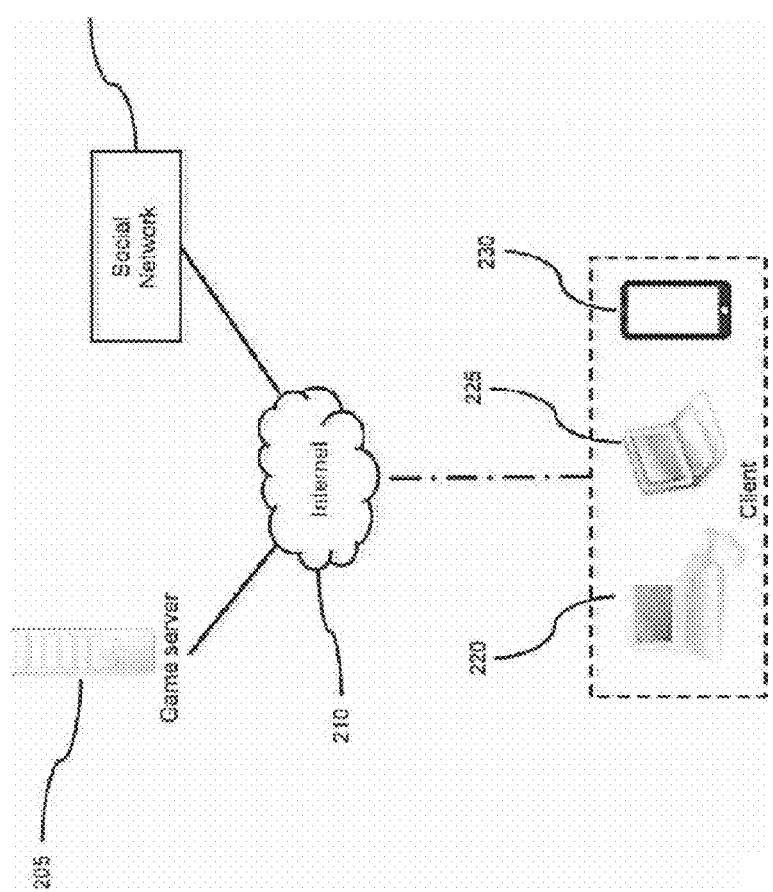
FIG. 7 is an exemplary computer environment.

FIG. 7 portrays an exemplary overall environment in which the present invention can be utilized. A virtual game is stored on for instance a game server 205. The virtual game is to be played on a client device, such a computer 220, 225 or a smartphone or other handheld device 230. The client device can also be a kiosk, arcade gaming station, smart TV or other device with computing capabilities, input devices and a screen that can present the game to a user. The client device communicates with the game server 205 and a social network server 215, for instance through the Internet 220 or other network. It should be understood that the social network server 215 and the game server 210 do not have to be located in different places, they could be on the same server or on a plurality of servers located in different locations. People skilled in the art will understand that other devices than the exemplary ones listed can also be used without departing from the spirit and scope of the invention.

Different Implementations

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another aspect is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game.

Game Description

Stitcheroo is a level-based action puzzle game in which players slide coloured bricks, or plushies, past each other to create line combinations of three or more. The game is played on a series of 9×9 game boards of plushies in 5-6 different colours with automatic refills along the z-axis to ensure a constantly filled game board. Three or more plushies of the same colour in a line or L/T-formation will create a combo, and refills may in turn generate chain combos. Any playable plushie may be swiped up, down, left or right and will pass under all other plushies in the same row or column until coming to a full stop against another plushie of the same colour, an obstacle or a wall. All passed plushies will naturally be moved one step in the opposite direction; enabling chain reactions among other plushie constellations. All passed plushies will naturally be moved one step in the opposite direction; enabling chain reactions among other plushie constellations.

Combos in Stitcheroo are made by sliding plushies to create groups of three or more of the same colour. Once a combo has been created, the group disappears, leaving room for new, random plushies to be refilled from above. Refills can, in turn, create further combos as they land, which will lead to further refills, and so on. All passed plushies will naturally be moved one step in the opposite direction, enabling further chain reactions among other plushie constellations behind the passing plushie.

Slide-by combos in Stitcheroo are made by sliding plushies past rows or columns of the same kind, momentarily forming a line combo. All slide-by combos are activated instantly, visualized by an animation of a wave of energy travelling from the sliding plushie to the ends of the combo line. The sliding plushie may then travel on to create further slide-by combos, regular combos or simply come to a stop against a wall or a plushie of the same colour. Either way, the sliding plushie always disappears. Upon disappearing, the squares left empty by the combos are refilled by random plushies as usual.

Golden Buttons

Golden buttons in Stitcheroo are score bonuses present on the game board, carrying a set amount of points when collected. To collect a golden button, a played plushie must pass or be placed on the square carrying it. Each level holds three randomly placed golden buttons, either appearing exposed from the start or hidden beneath an obstacle. To reveal a hidden golden button, the obstacle hiding it must first be removed, upon which the golden button may be collected as normal. If not collected before the end of a level, any exposed golden buttons will be transferred to the next level, while hidden ones are lost. Golden buttons which are transferred between levels can never be re-hidden.

Obstacles & Boundaries

Obstacles in Stitcheroo are either destructible or indestructible. Indestructible obstacles are just another name for level boundaries, which may appear anywhere and in any shape on the game board. Destructible obstacles, however, are actual objects present on the game board. Visually represented as thimbles, the obstacles have two basic states; silver and bronze. To clear an obstacle, combos need to be made adjacent to it, upon which the obstacle goes from bronze to silver before completely vanishing. By clearing obstacles, the freed up squares will automatically fill up with plushies and enable the player to pass unhindered.

Special Combos

4-Combo

Creating a 4 line-combo instantly causes an animation of all combined plushies to contract in a generic smoke effect. From the effect, the two end plushies slide off in opposite directions without hesitation, possibly creating chain combos.

5-Combo

Creating a 5 line- or L/T-combo instantly causes an animation of all combined plushies to contract in a generic smoke effect. From the effect, the last added plushie continues on without delay at the same time as all plushies of the same colour start to slide along in the same direction, able to create reverse combos on the way, before ultimately exploding without radius (i.e. without involving other plushies) against any obstacles or wall.

6-Combo

Creating a 6 T-combo instantly causes an animation of all combined plushies to contract in a generic smoke effect. From the effect, the last added plushie carries on uninterrupted in the same direction until reaching an obstacle or wall, clearing all plushies in its way. Upon impact, the plushie bounces while changing columns or rows and sliding back the same way it came. This repeats until reaching the far corner of the wall in the general direction of movement, where the plushie ultimately explodes without radius.

7-Combo

Creating a 7 T-combo instantly causes an animation of all combined plushies to contract in a generic smoke effect. From the effect, a plushie of the combination's colour emerges and grows rapidly on the square of the last added plushie, until reaching the size of 3×3 squares. Finally exploding in a big cloud of dust while shaking the camera violently, the super-sized plushie then sends all plushies on the game board flying cheerily off screen. Naturally, all obstacles are removed in the blast, revealing and collecting any hidden golden buttons, along with already exposed ones.

FIGS. 1-5 show an edited version of the game board as it will be rendered to a user on the display of his computer device. The board has been reduced to a 5×5 grid and only partially filled for illustrative purposes. The game objects are represented by simplified shapes in this instance, and are called 'plushies'. When operated by a user input device in the form of a mouse, a plushie can be moved by clicking and holding it, then dragging the plushie in any of the 4 axis parallel directions within the x-y plane of the board (up, down, left or right). The plushie will only slide if, by moving in the selected direction, it will make a group of at least 3 matching plushies in a combo at some point before stopping. The plushie will slide even if it is not directly involved in the combo if the movement of another plushie causes a combo, as in to make a reverse combo. A plushie will stop if it meets an obstacle, or another plushie of the same colour, or the edge of the board. If it reaches any of these having been directly involved in a slide-by combo it will explode.

Plushies have characteristics, such as colour and shape, which can be used to identify matches.

Figure 1A:
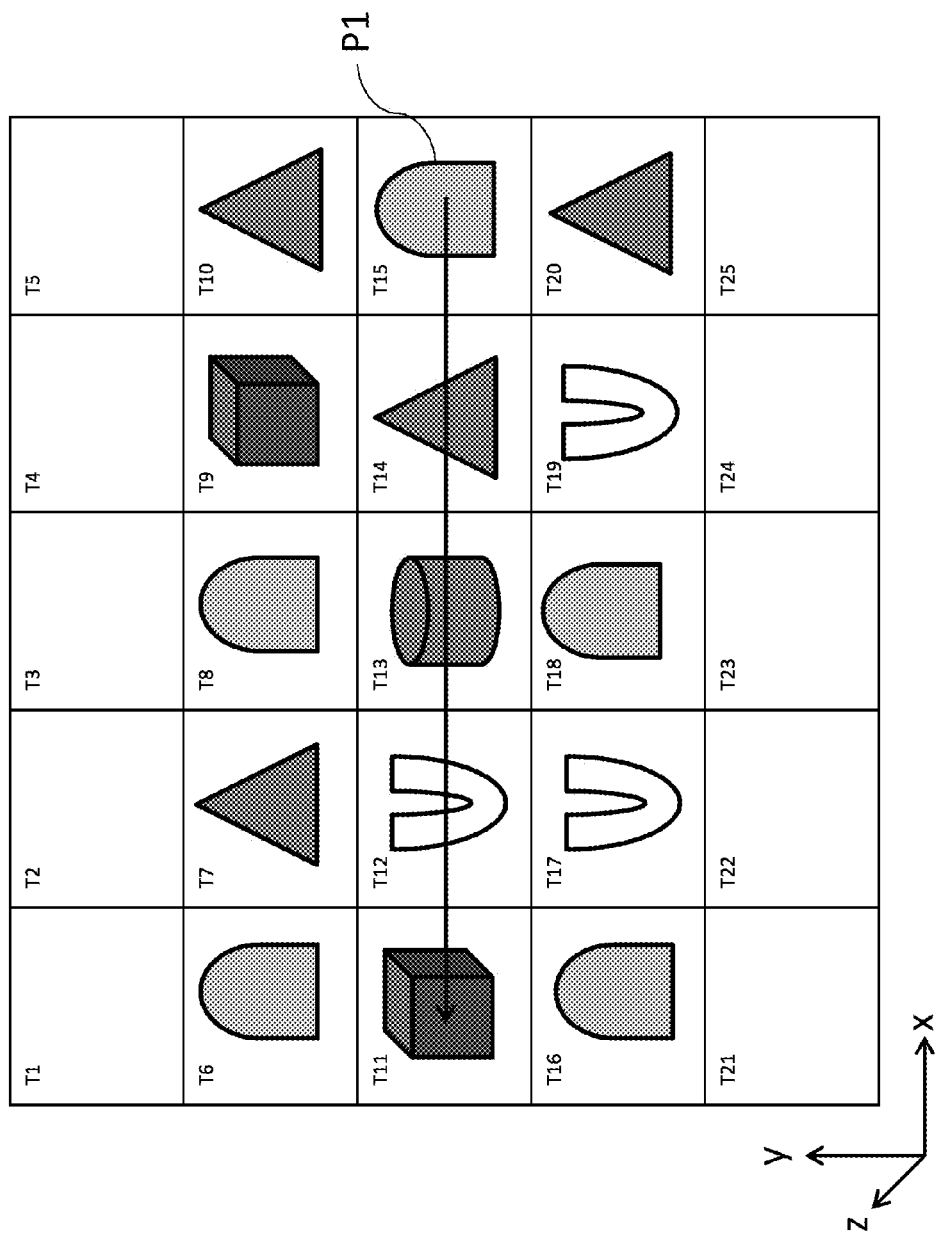
FIGS. 1a to 1g illustrate a plushie slide in one game board configuration.

FIG. 1a shows a section of a typical board, a domed plushie P1 in tile T15 has been chosen and dragged in the negative x direction (to the left) on the board. This is an allowed move as a 3 line combo will be made as a result.

Figure 1B:
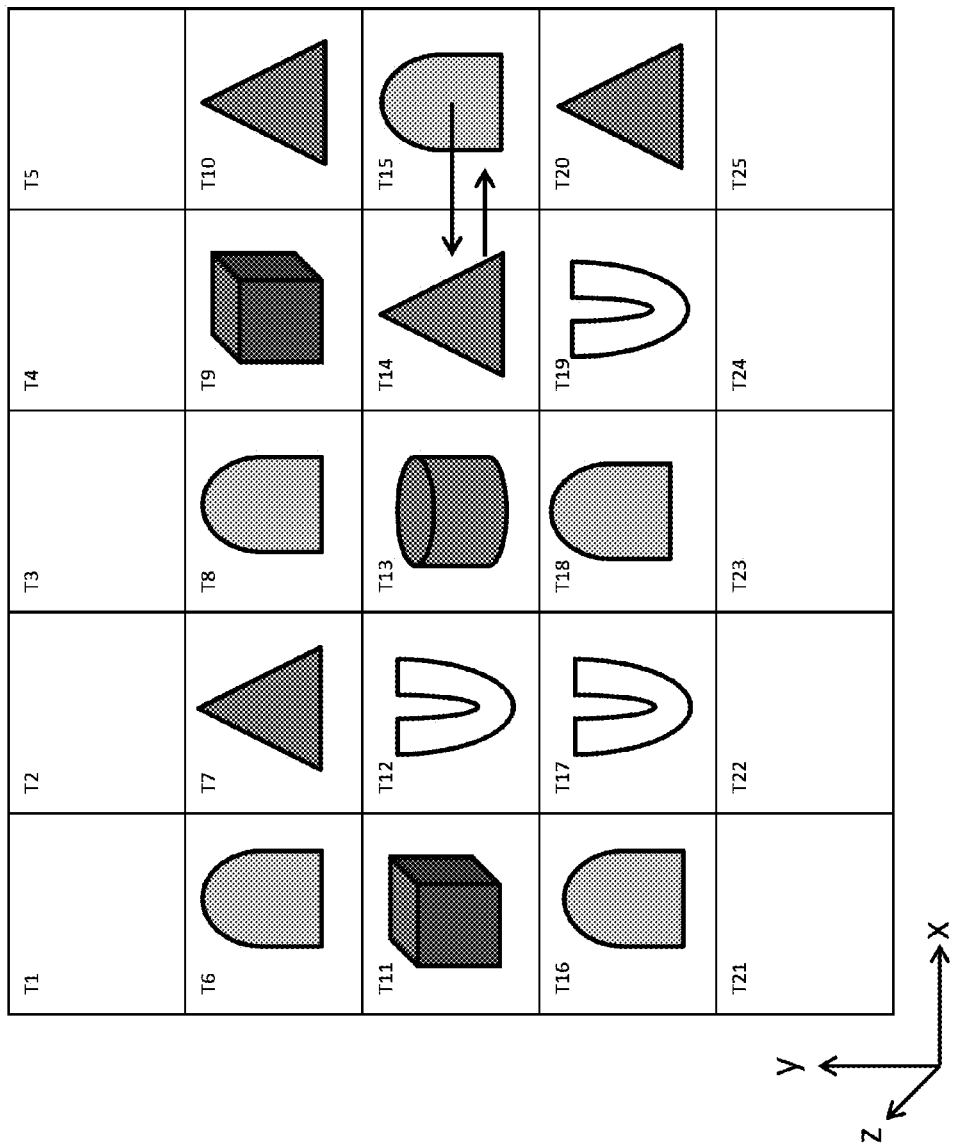

FIG. 1b shows the first move the plushie T15 will make. The domed plushie of T15 will move to the left, under the triangular plushie in tile T14. The triangular plushie in tile T14 will move to the right, to fill the tile previously occupied by the sliding domed plushie, T15. This is referred to as a 'swap' or 'reverse swap'.

Figure 1C:
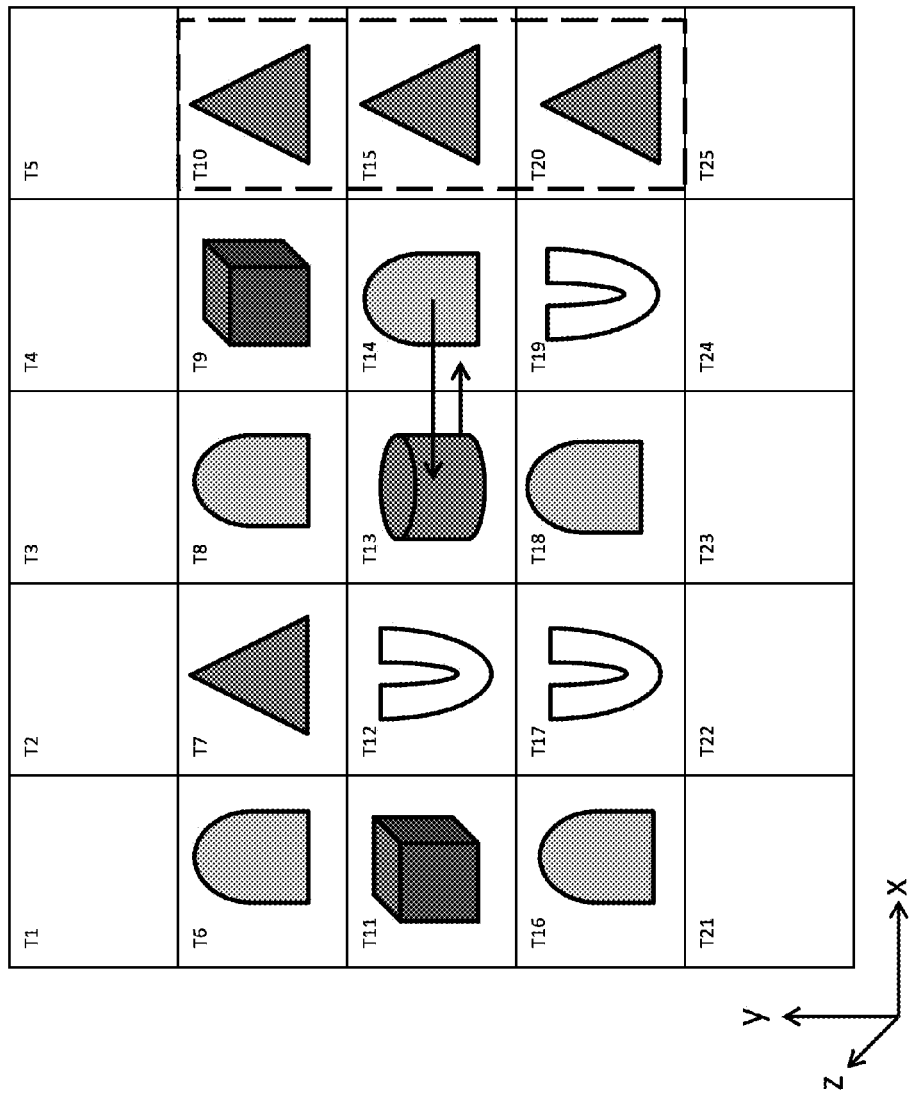

FIG. 1c shows the result of the first move. The next element movement is indicated with arrows. The triangular plushie, having moved to tile T15, has made a 3 line combo in the y direction at tiles T10, T15, and T20. This is a reverse combo. The domed plushie continues across the board and slides under the next cylindrical plushie at T13.

Figure 1D:
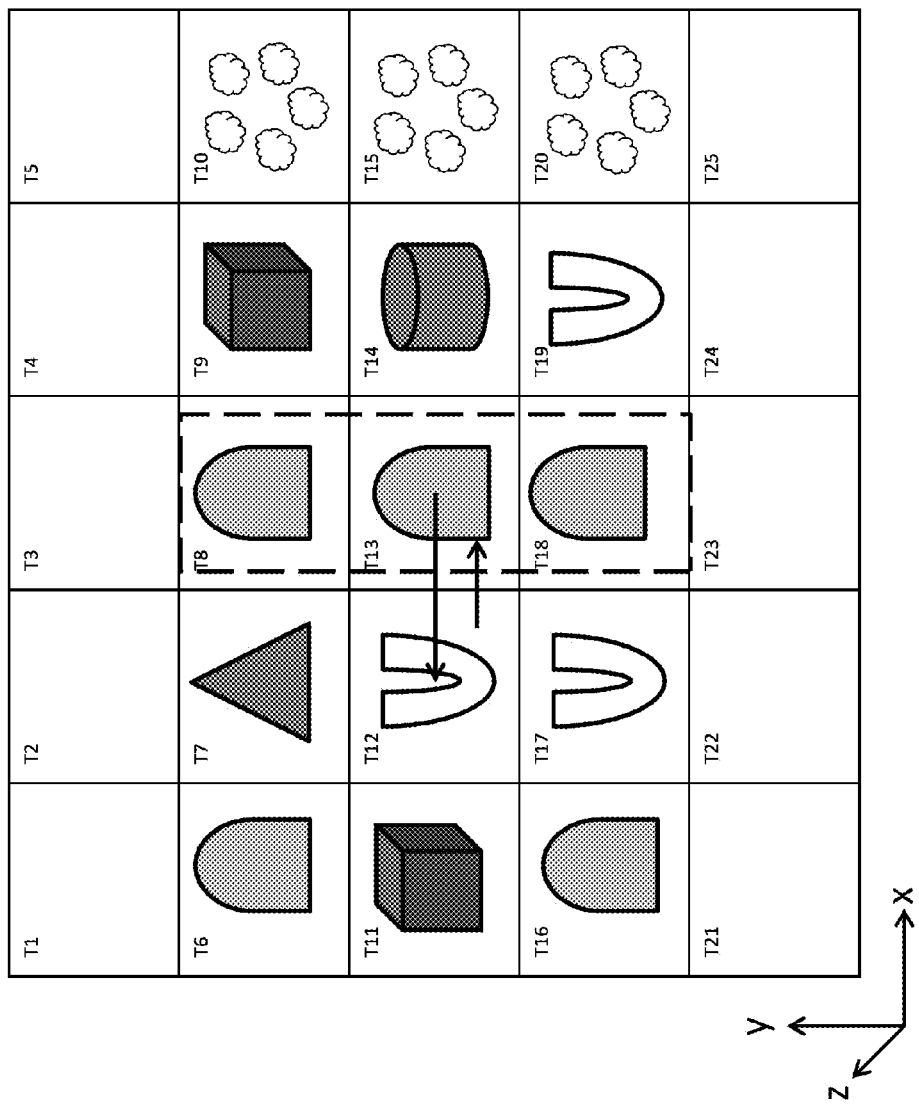

FIG. 1d shows the domed plushie having moved under the cylindrical plushie to T13. The cylindrical plushie having taken the place the domed plushie left behind at T14. The 3 matched triangular plushies (at T10, T15, and T20) have now exploded denoted by a wavy line, which represents an animation which would be displayed. The domed plushie at T13 now creates a new group of 3 in the y direction. This is a slide-by combo. The domed plushie at T13 continues to slide to the left. Arrows indicate the next element movement.

Figure 1E:
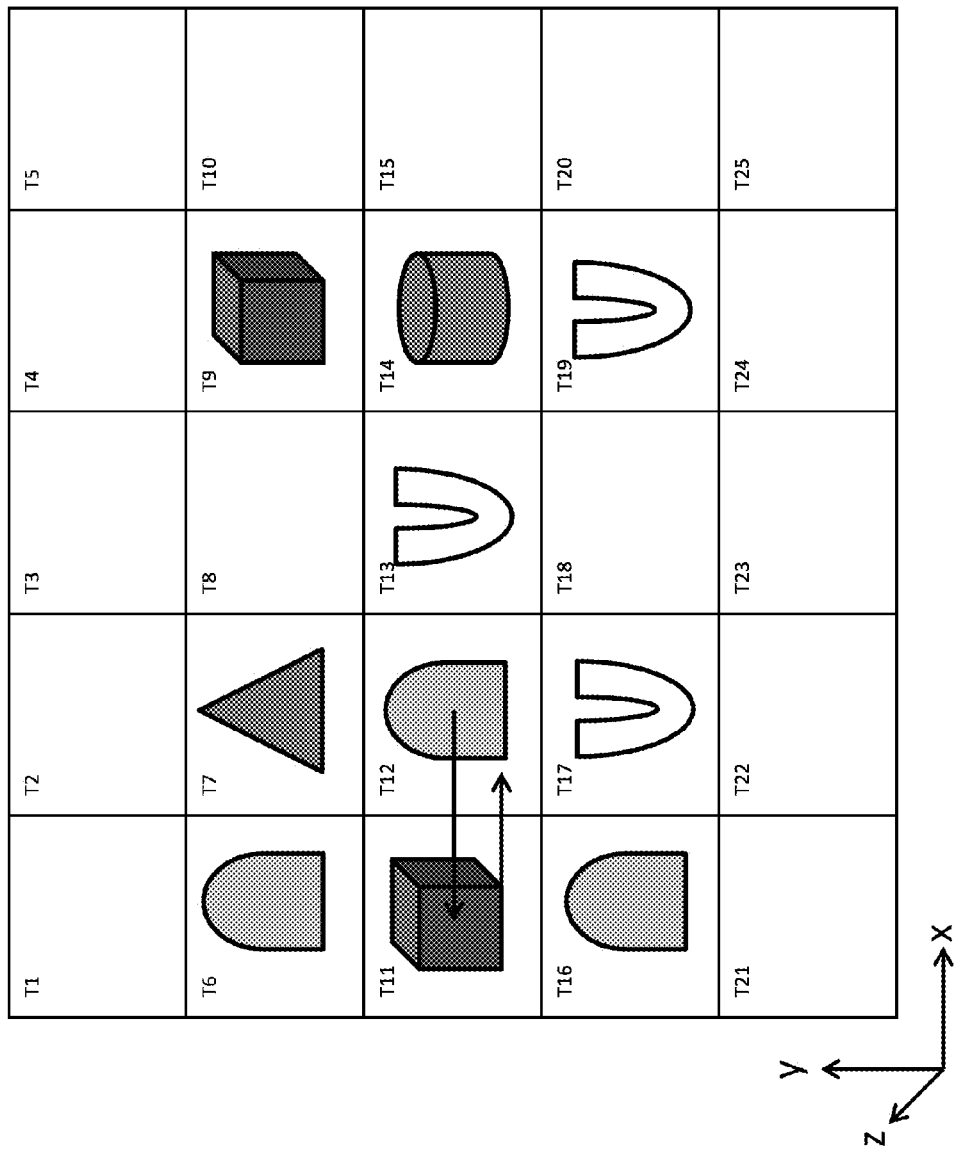

FIG. 1e shows the board after the domed plushie has moved under the next, 'u' plushie to T12. The 'u' plushie has moved to tile T13. The two stationary domed plushies that were at T8 and T18 in FIG. 1d have exploded. The domed plushie at T12 continues to slide.

Figure 1F:
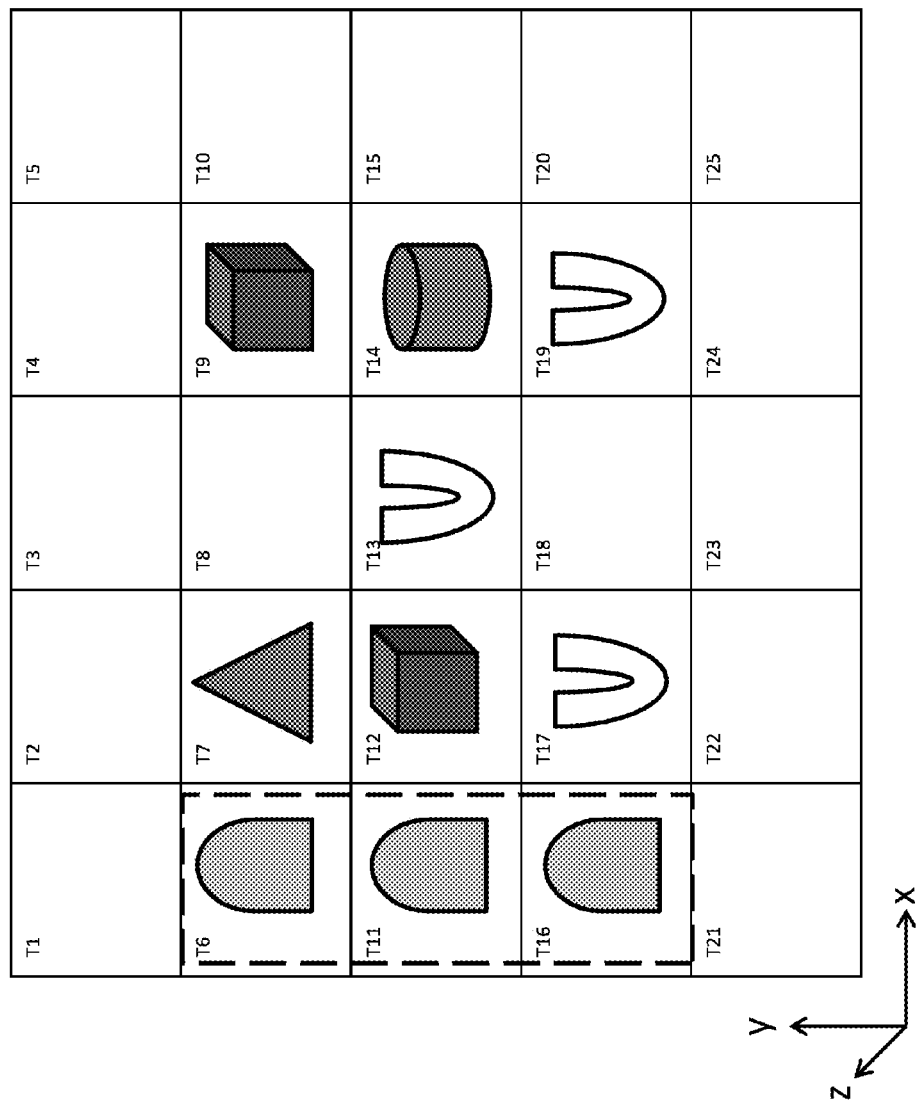

FIG. 1f shows the domed plushie reaching the edge of the board at T11. The domed plushie has moved past the cube plushie at T11, which has moved into the hole left behind at T12. The domed plushie makes another group of 3 in the y direction at T6, T11, and T16. The domed plushie at T11 cannot slide any further as it has reached the board edge.

Figure 1G:
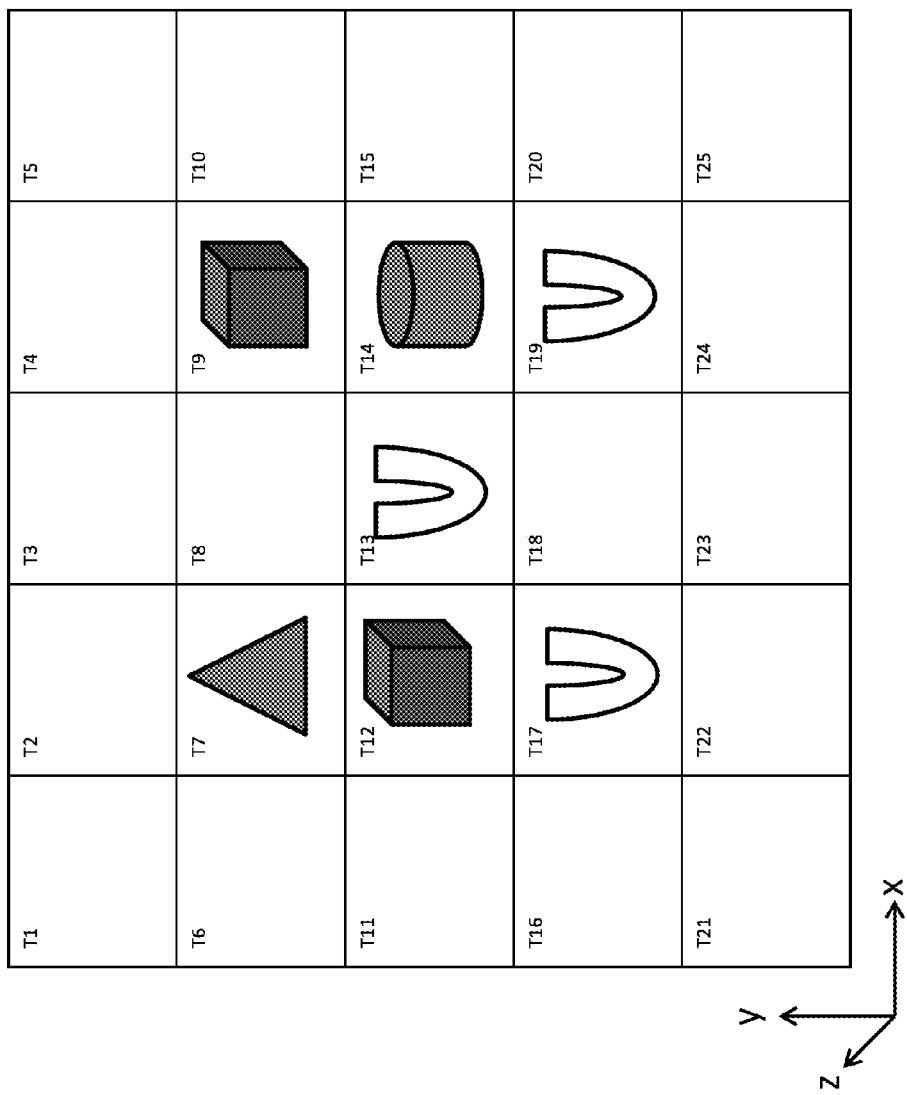

FIG. 1g shows the board after the whole slide of the domed plushie is completed. All of the events in FIGS. 1a-f occur without any further user input after the original click and drag of the domed plushie at T15 in FIG. 1a. The final group of 3 has vanished, the central domed plushie also vanishing as it has reached the edge of the board, and thus the end of its slide.

Figure 2:
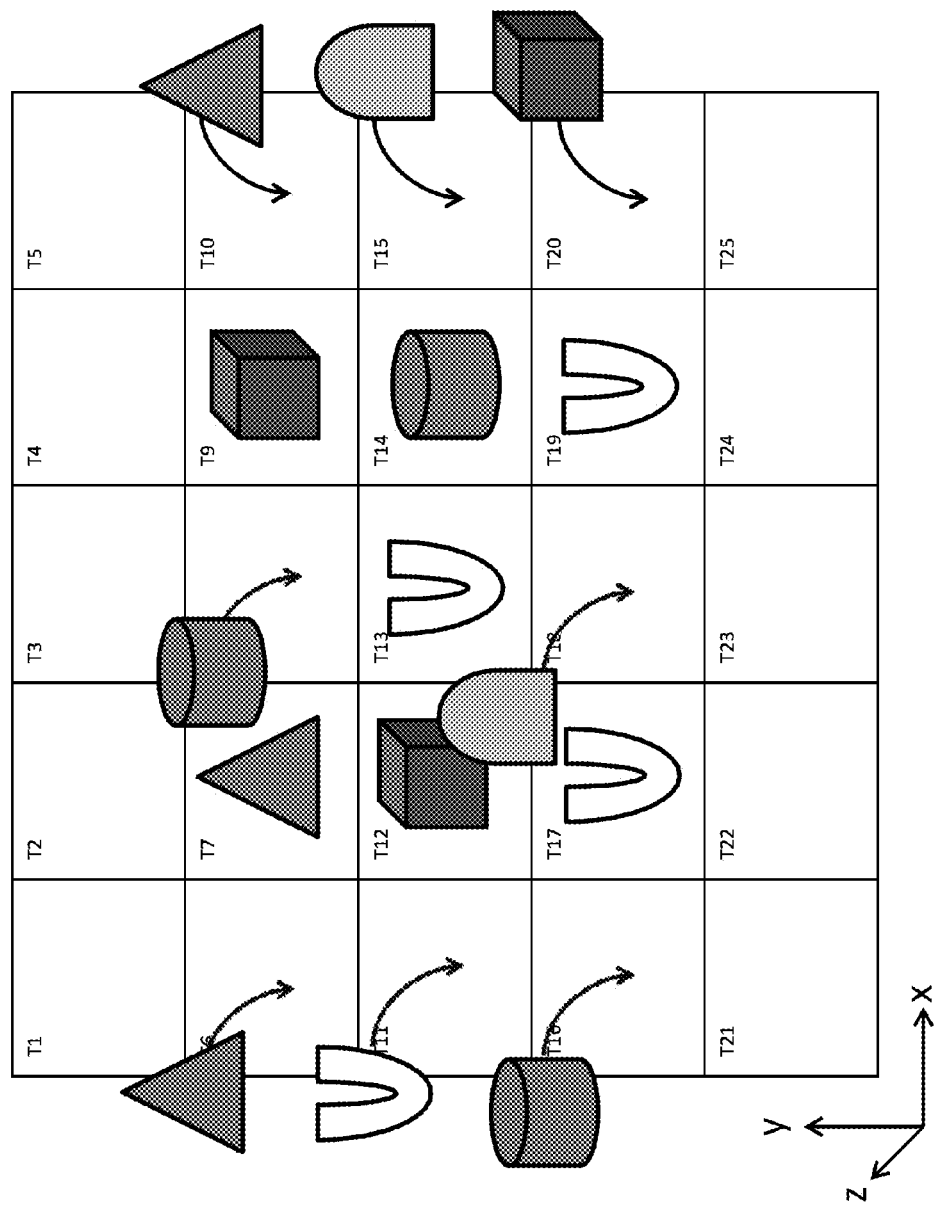
FIG. 2 illustrates a z-axis refill.

FIG. 2 shows the refilling of the holes left in the board after the plushies forming the combos outlined by dashed lines in FIGS. 1c, 1d, and 1f have exploded. Holes are filled with plushies selected at random. The board is refilled along the z-axis (from above). Here all holes are shown refilling at the same time for illustrative purposes. In the actual gameplay, holes may be filled while other combos are being made elsewhere on the board.

Refilling the board is postponed during the outcomes of 4, 5, 6 and 7 combos so as not to obscure the player's vision with falling plushies.

Figure 3A:
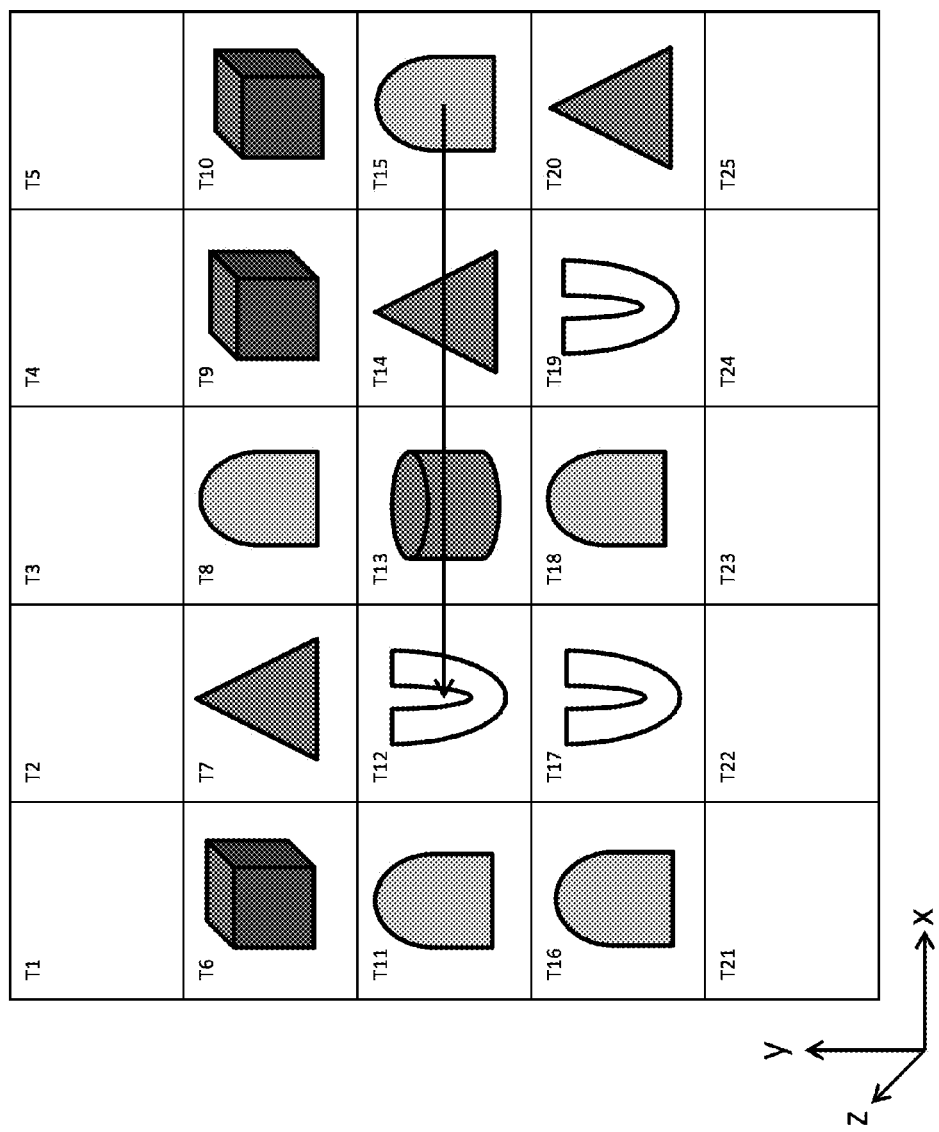
FIGS. 3a to 3f illustrate a plushie slide in another game board configuration.

FIG. 3a shows another typical board arrangement. The domed plushie in T15 is held and dragged to the left. The arrow shows the plushie's entire slide.

Figure 3B:
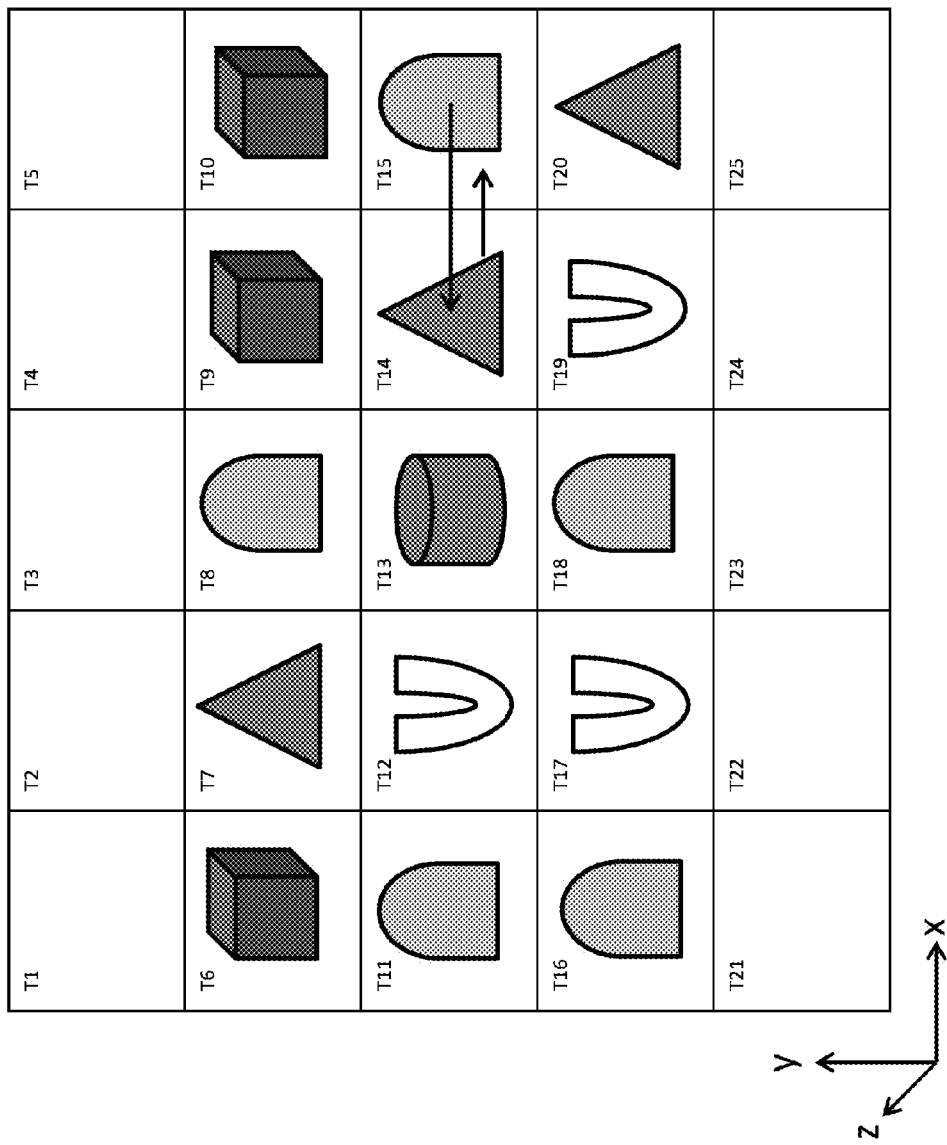

FIG. 3b shows the first move the domed plushie will make indicated with arrows. The domed plushie at T15 will move to the left, under the triangular plushie at T14. The triangular plushie will move to the right to T15, to fill the tile previously occupied by the sliding domed plushie.

Figure 3C:
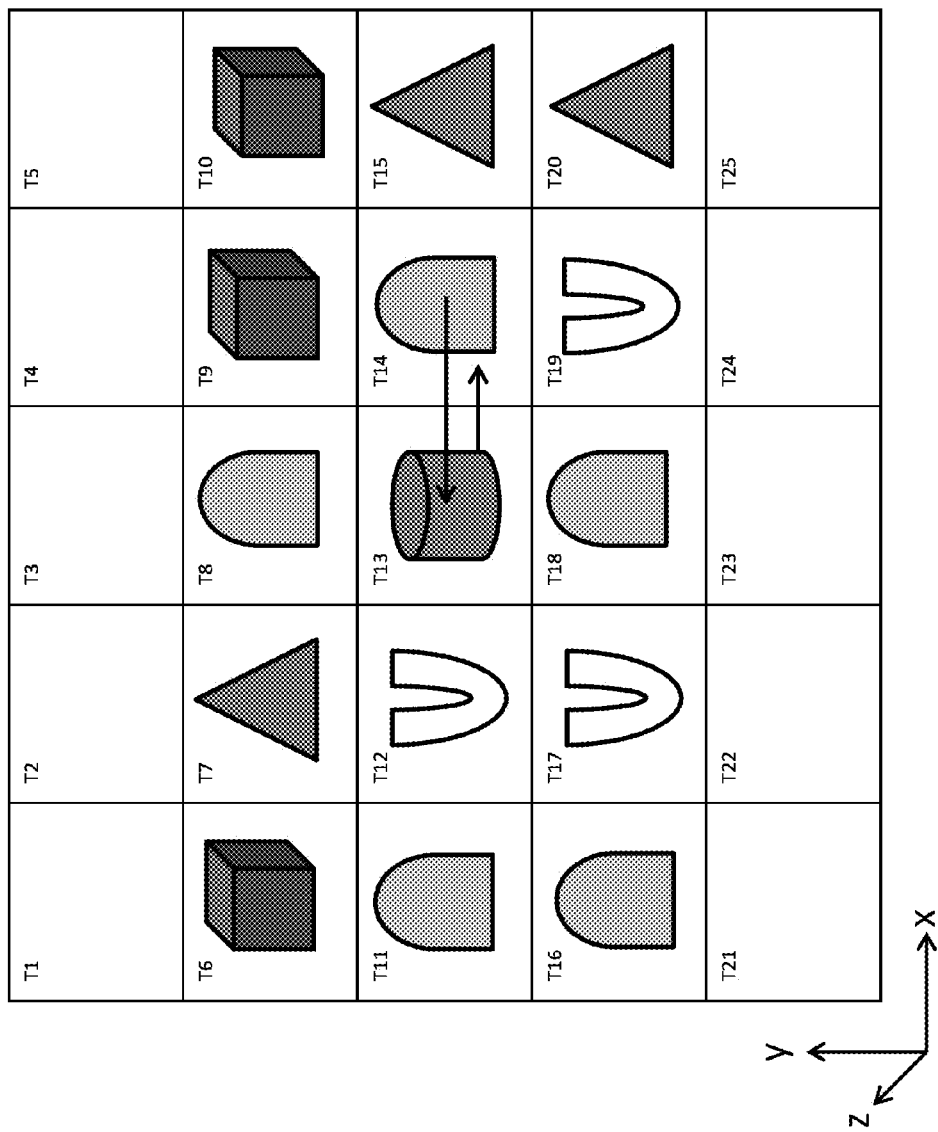

FIG. 3c shows the board after the domed plushie has moved to T14. The next move is indicated with arrows.

Figure 3D:
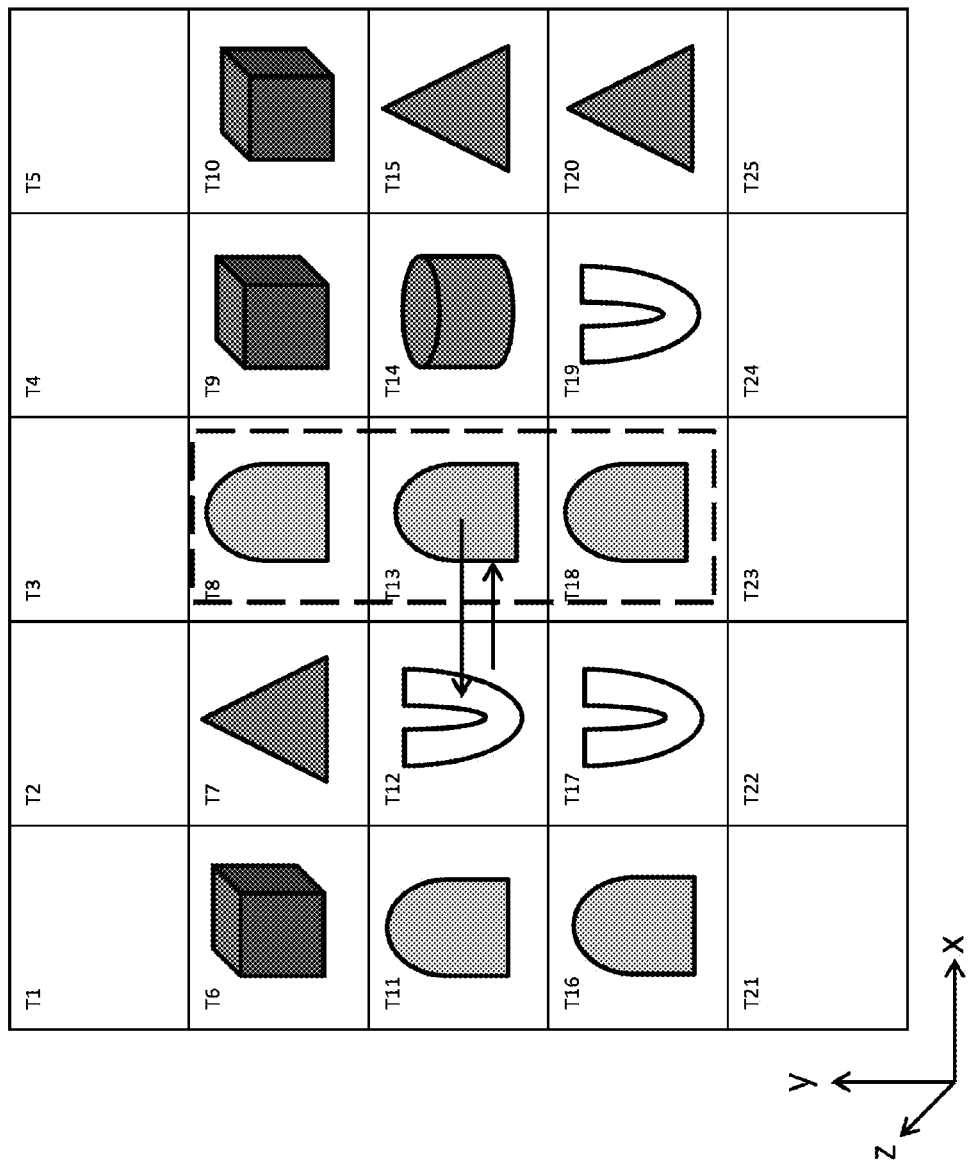

FIG. 3d shows the domed plushie at T13 having swapped places with the cylindrical plushie now at T14. The domed plushie now makes a slide-by combo with the domed plushies at T8 and T18. This slide-by combo is outlined using a dashed line. The arrows show the next move for the sliding domed plushie.

Figure 3E:
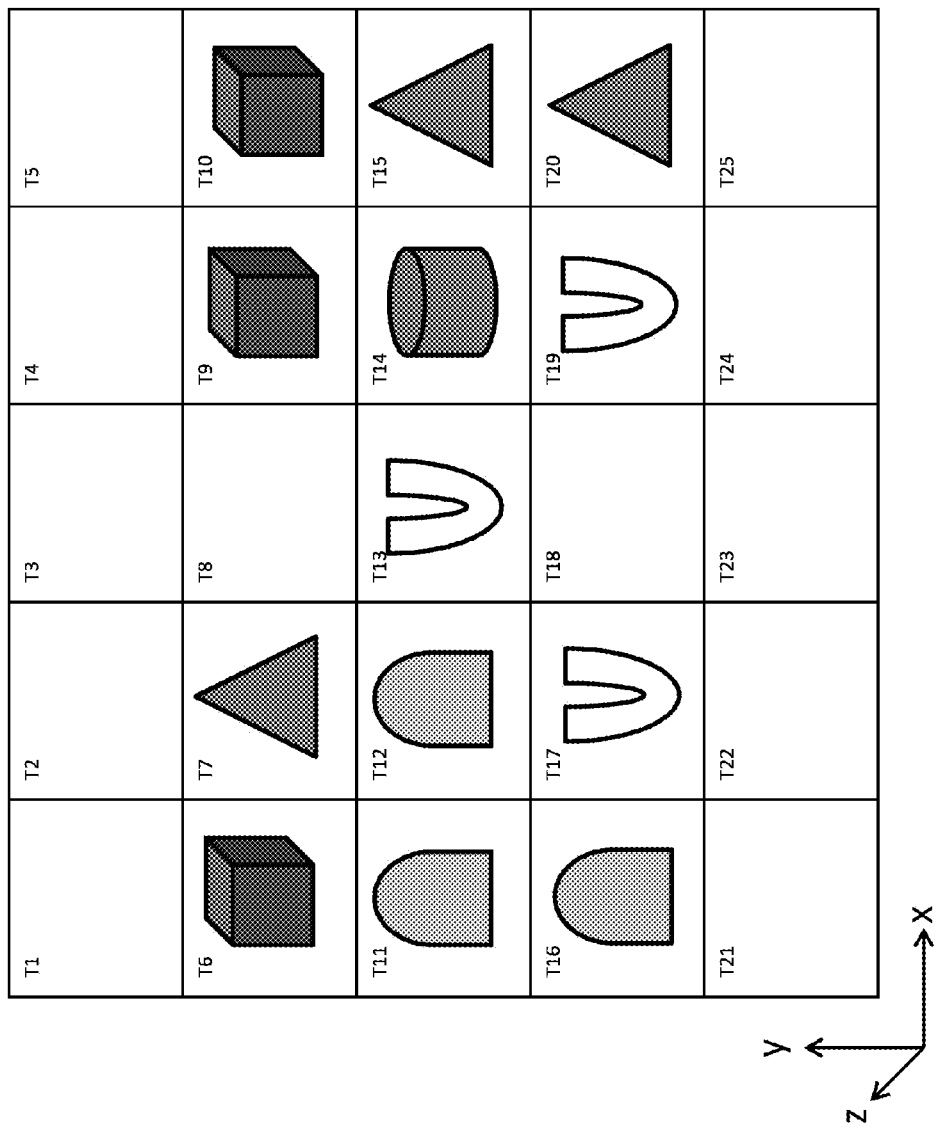

FIG. 3e shows the result of the domed plushie continuing to T12, having swapped places with the 'u' plushie now at T13. The two stationary domed plushies from T8 and T18 involved in the Slide-by combo have exploded. The sliding domed plushie now comes to a stop at T12. This is because it has reached a plushie of the same type (colour/shape).

Figure 3F:
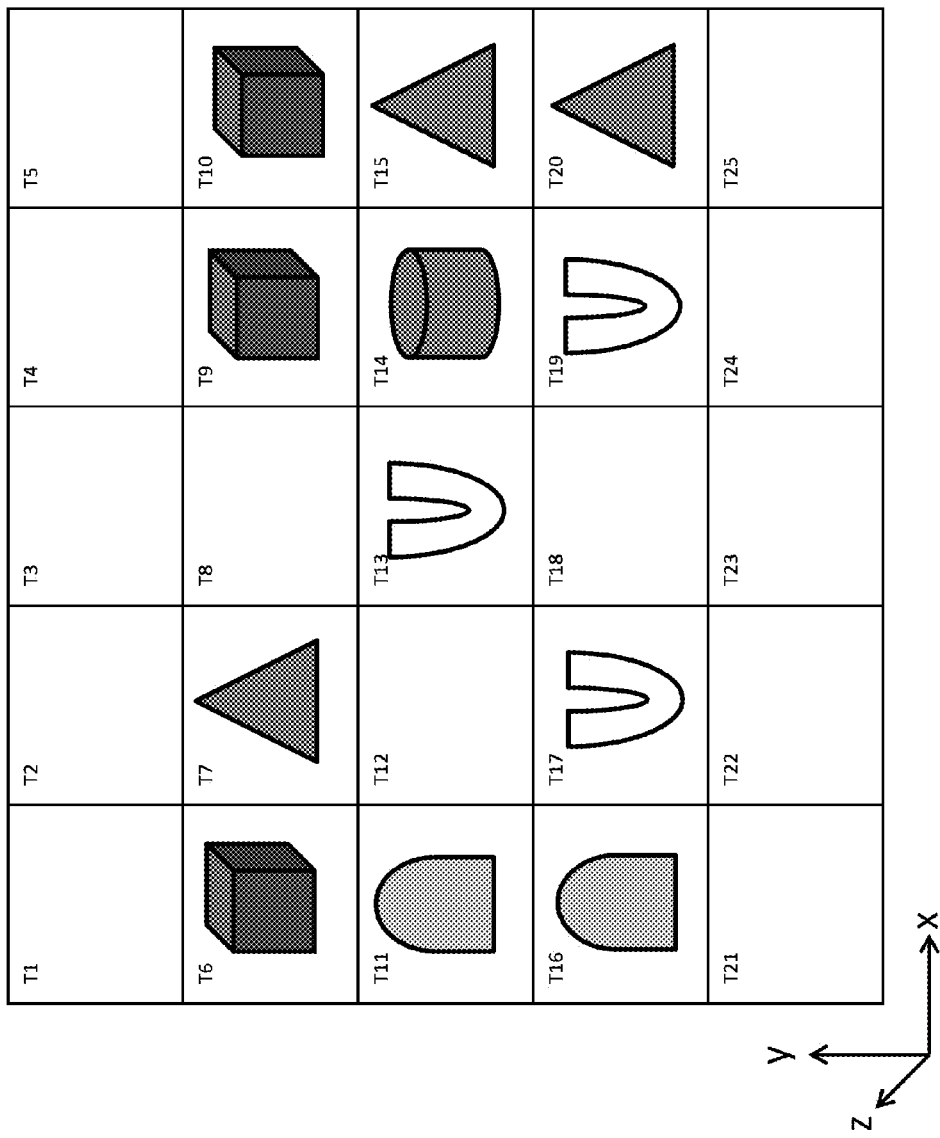

FIG. 3f shows the board after the sliding domed plushie has disappeared from T12. The plushie previously at T12 has exploded as a result of having been directly involved in a combo. By which it is meant that at some point during the slide it formed a combo which included it and at least 2 other plushies of the same type (colour/shape).

Figure 4A:
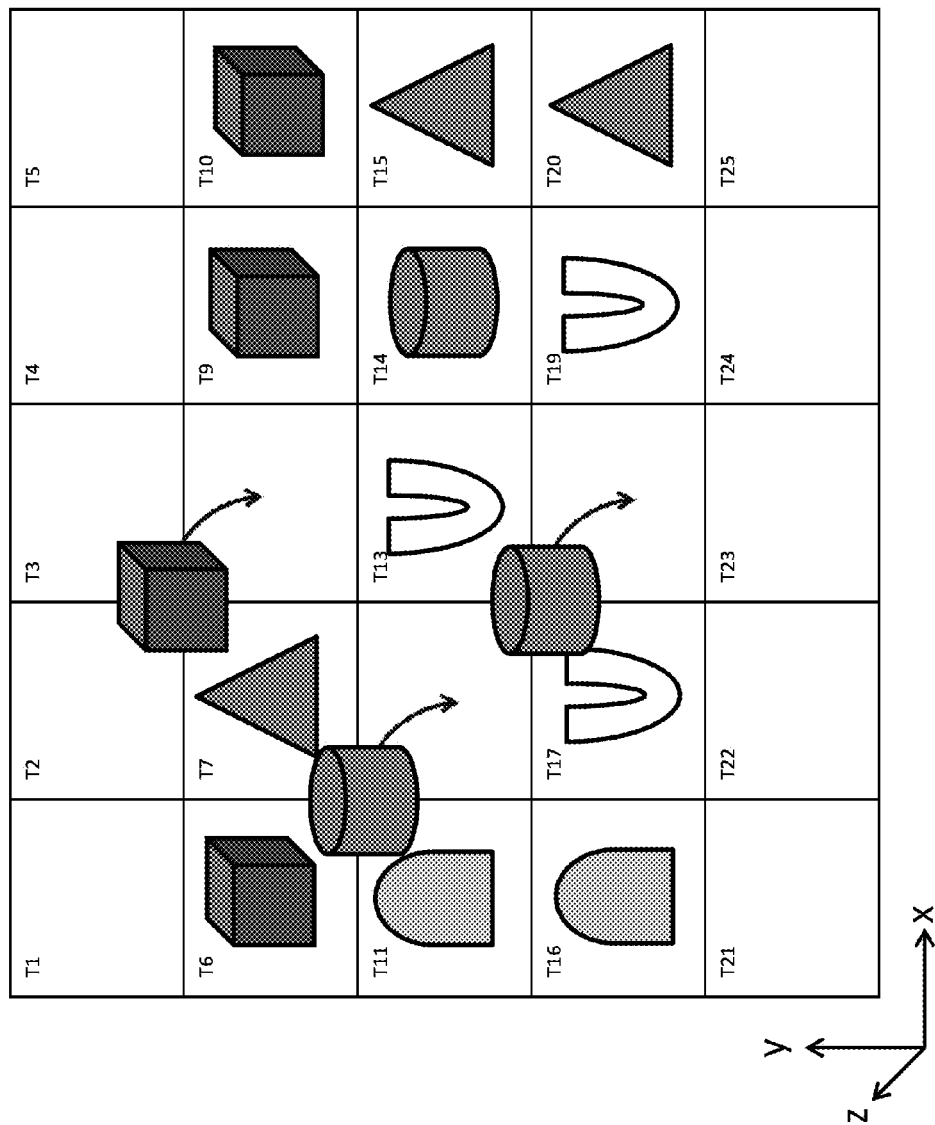
FIGS. 4a to 4c illustrate a z-axis refill sequence with a combo.

FIG. 4a shows the refilling of the holes left in the board from the Slide-by combo outlined by a dashed line in FIG. 3d. This is done along the z-axis as shown previously in FIG. 2. Refilling the board from the z-axis allows for minimal changes to the board between moves. This enables a player to make a new combo by sliding another plushie while holes are being refilled elsewhere on the board.

Figure 4B:
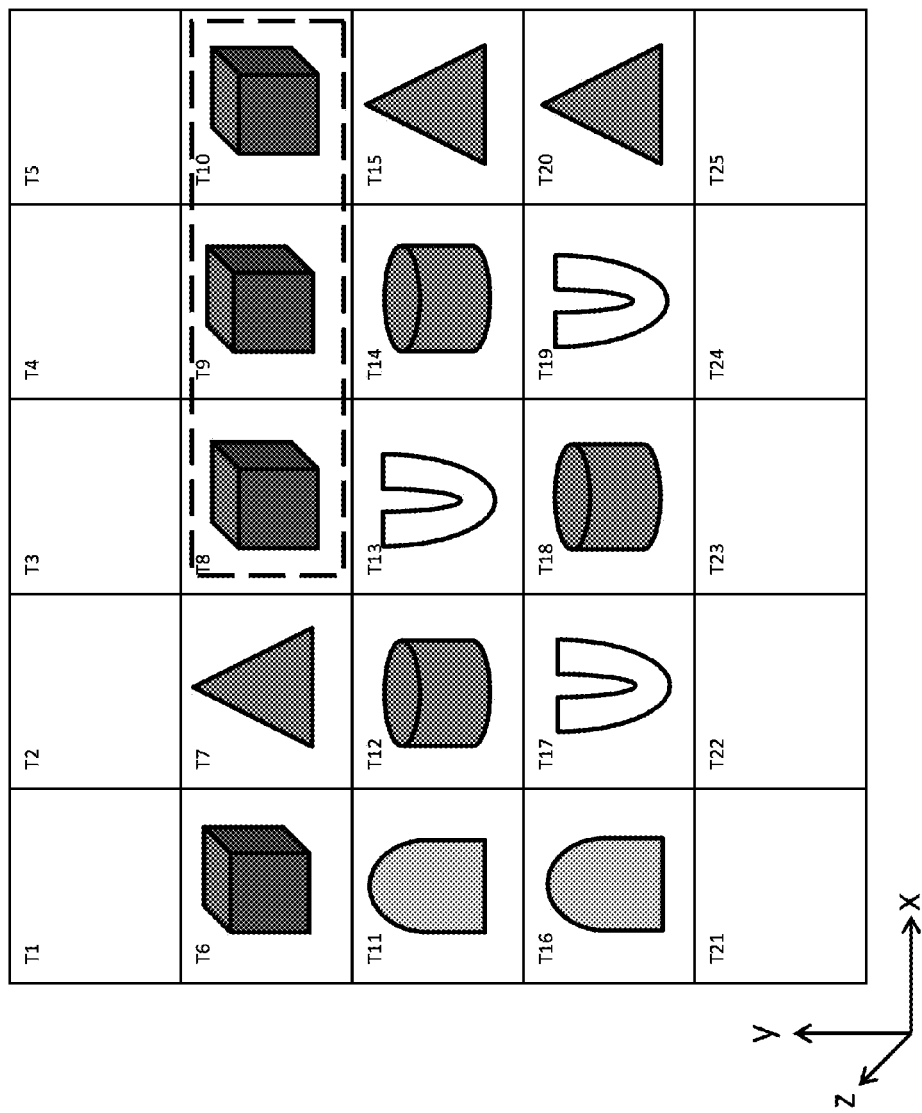

FIG. 4b shows a group of three red plushies being made at tiles T8, T9, and T10 as a result of the random refilling of the holes on the board. This combo disappears as part of the original move, with no extra input required from the player.

Figure 4C:
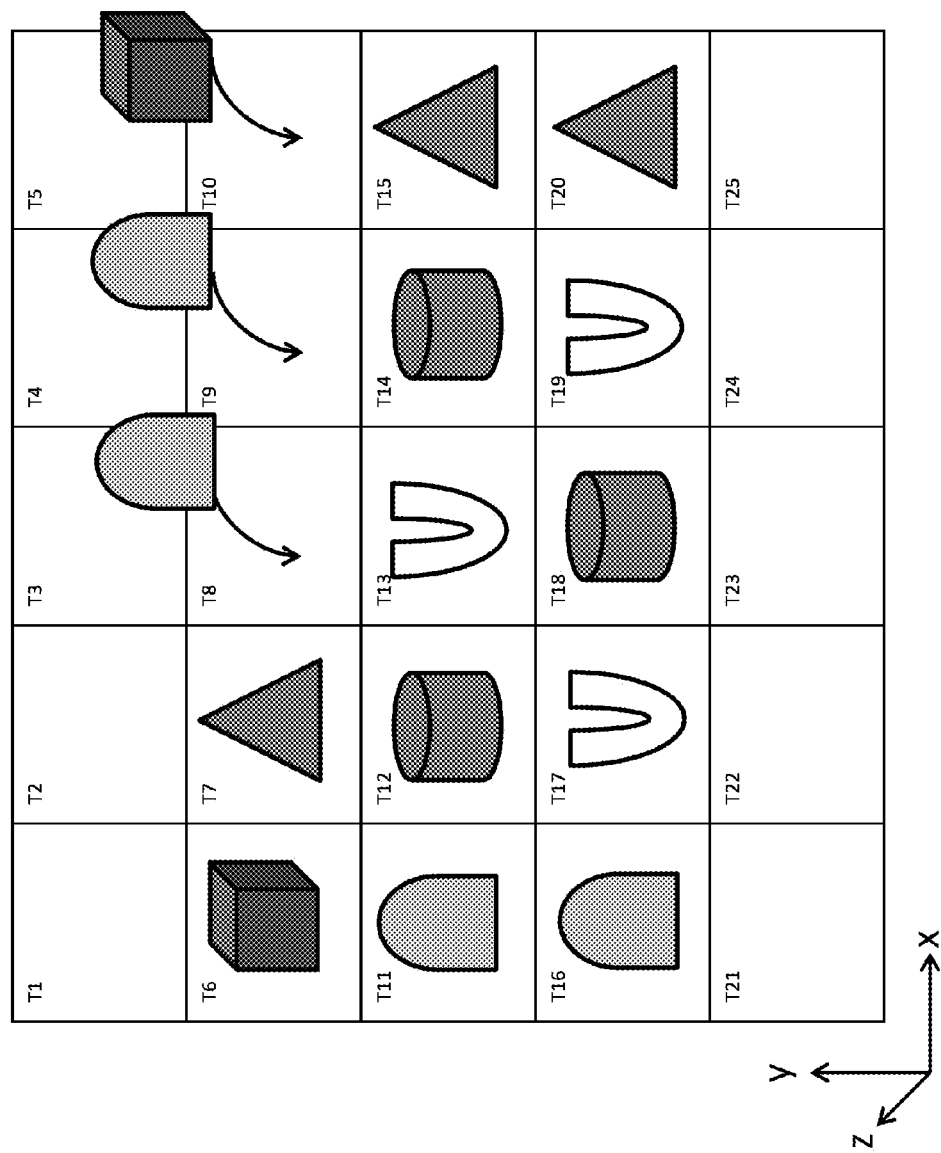

FIG. 4c shows the board after the 3 combo of red plushies has exploded. No plushies were moving so the refilling of these 3 holes will be the only change to the board. Refilling is along the z-axis.

Figure 5A:
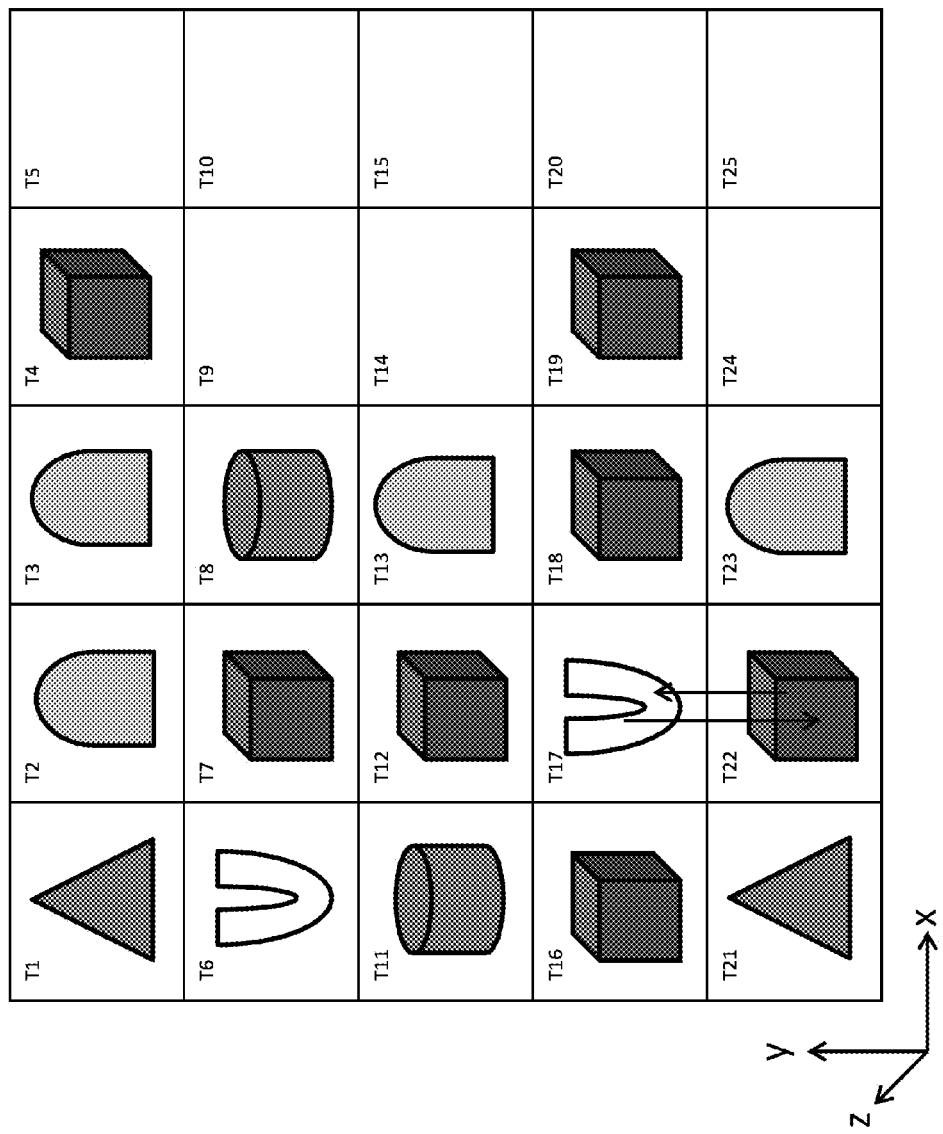
FIGS. 5a to 5d illustrate a 6-combo.

FIG. 5a shows the board set where the next move will create a 6-combo. The move to create the 6-combo is shown using arrows. A cube plushie at T22 will switch with a 'u' plushie at T17. Part of the board has not been filled with plushies for illustrative purposes only.

Figure 5B:
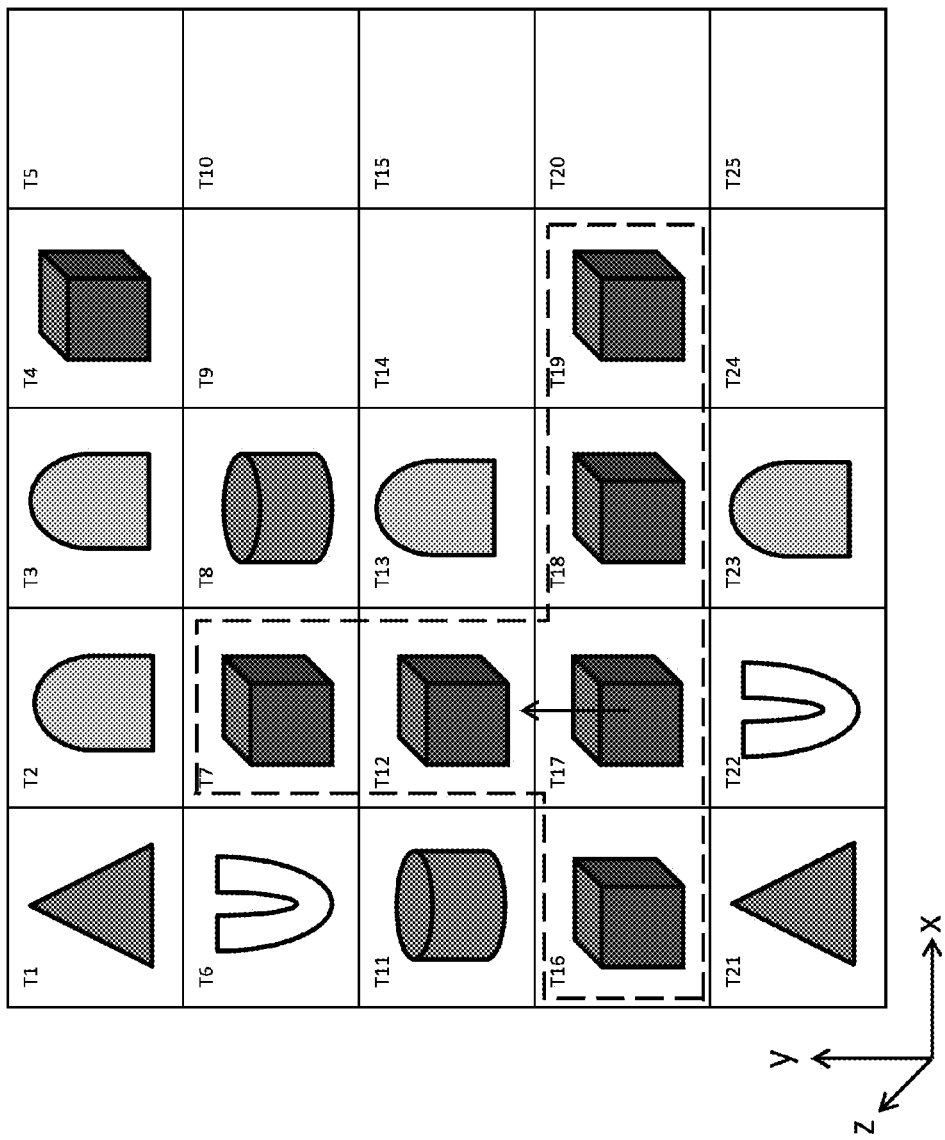

FIG. 5b shows the 6-combo outlined by a dashed line. The 6-combo encompasses plushies in tiles T7, T12, T16, T17, T18, and T19. The 'u' plushie now occupies tile T22.

Figure 5C:
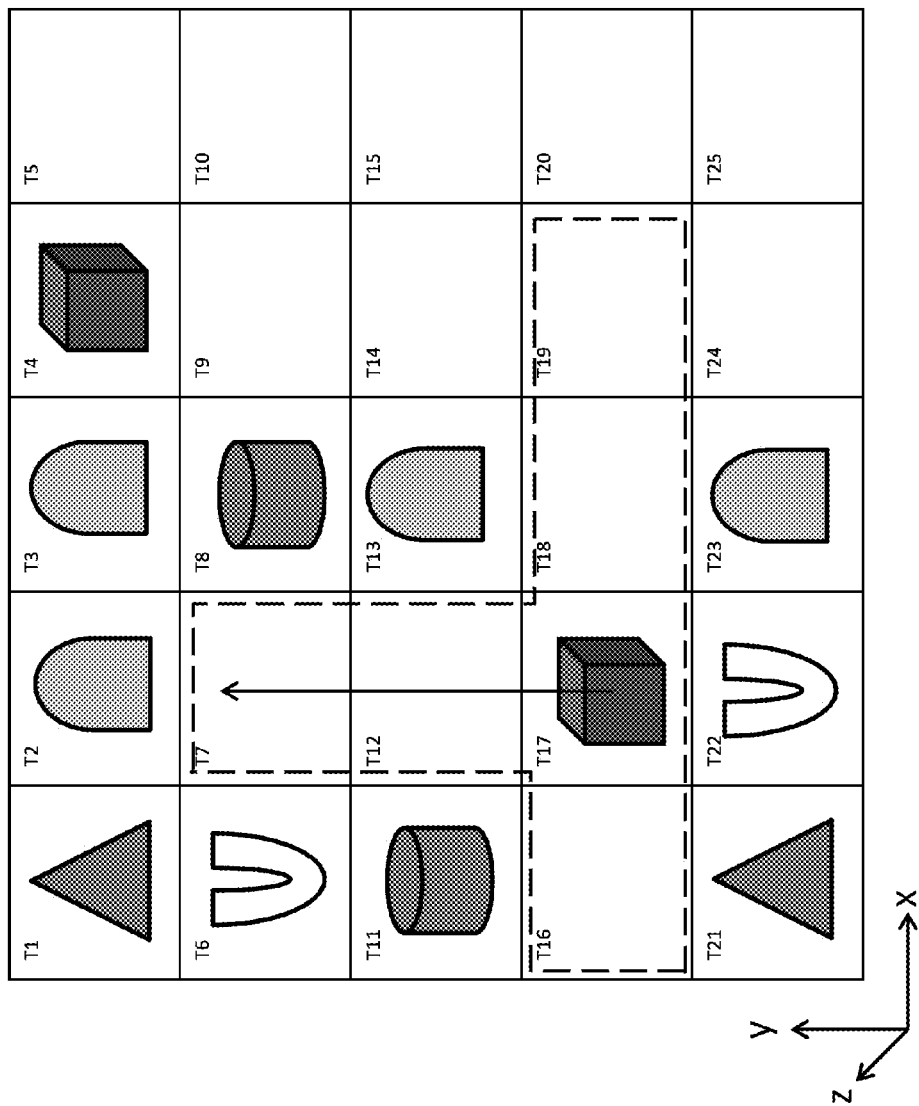

FIG. 5c shows the board immediately after the 6-combo is made. The 6-combo instantly causes an animation of all combined plushies to contract in a generic smoke effect. From the effect, the last added plushie at tile T17 carries on uninterrupted in the same direction, until reaching an obstacle or wall, clearing all plushies in its way, for example the plushie at T2. Blasting plushies resulting from 4 and 6 combos can pass holes, move out of the grid and cross each other's paths.

Figure 5D:
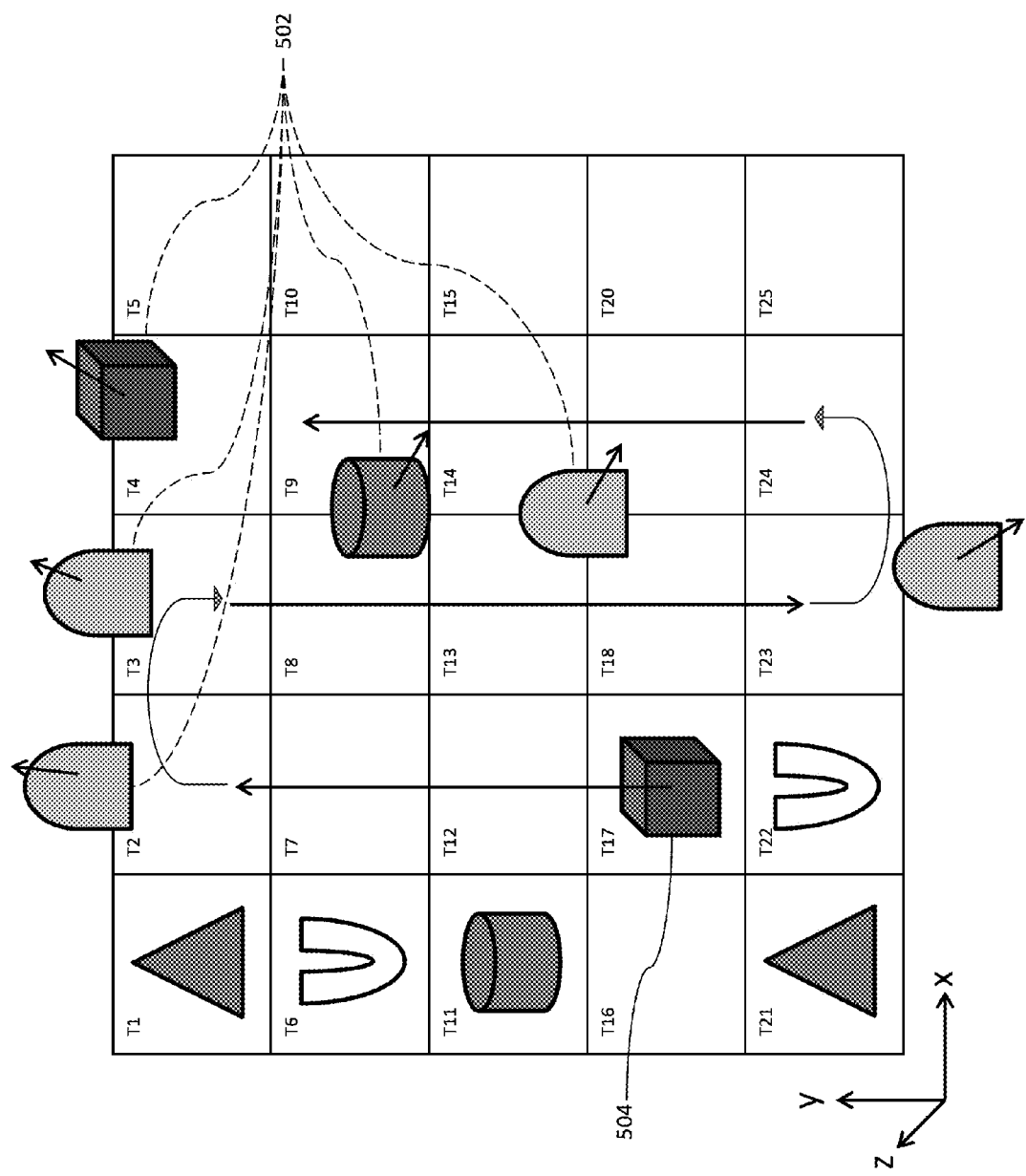

FIG. 5d shows how the last added plushie at T17 carries on sliding uninterrupted in the same direction. When reaching a wall or the board edge, the boosted plushie bounces upon impact, and continues in the opposite direction in the adjacent column or row. The boosted plushie clears all plushies in its way. Cleared plushies 502 can be seen flying off in various directions having previously occupied tiles T2, T3, T8, T13, T23 and T4. Cleared plushies leave the board completely. This continues until the boosted plushie 504 reaches the far corner of the wall in the general direction of movement, where the plushie ultimately explodes without radius. No plushies are spawned during the booster motion, so as not to obscure the player's vision with falling plushies.

Figure 8:
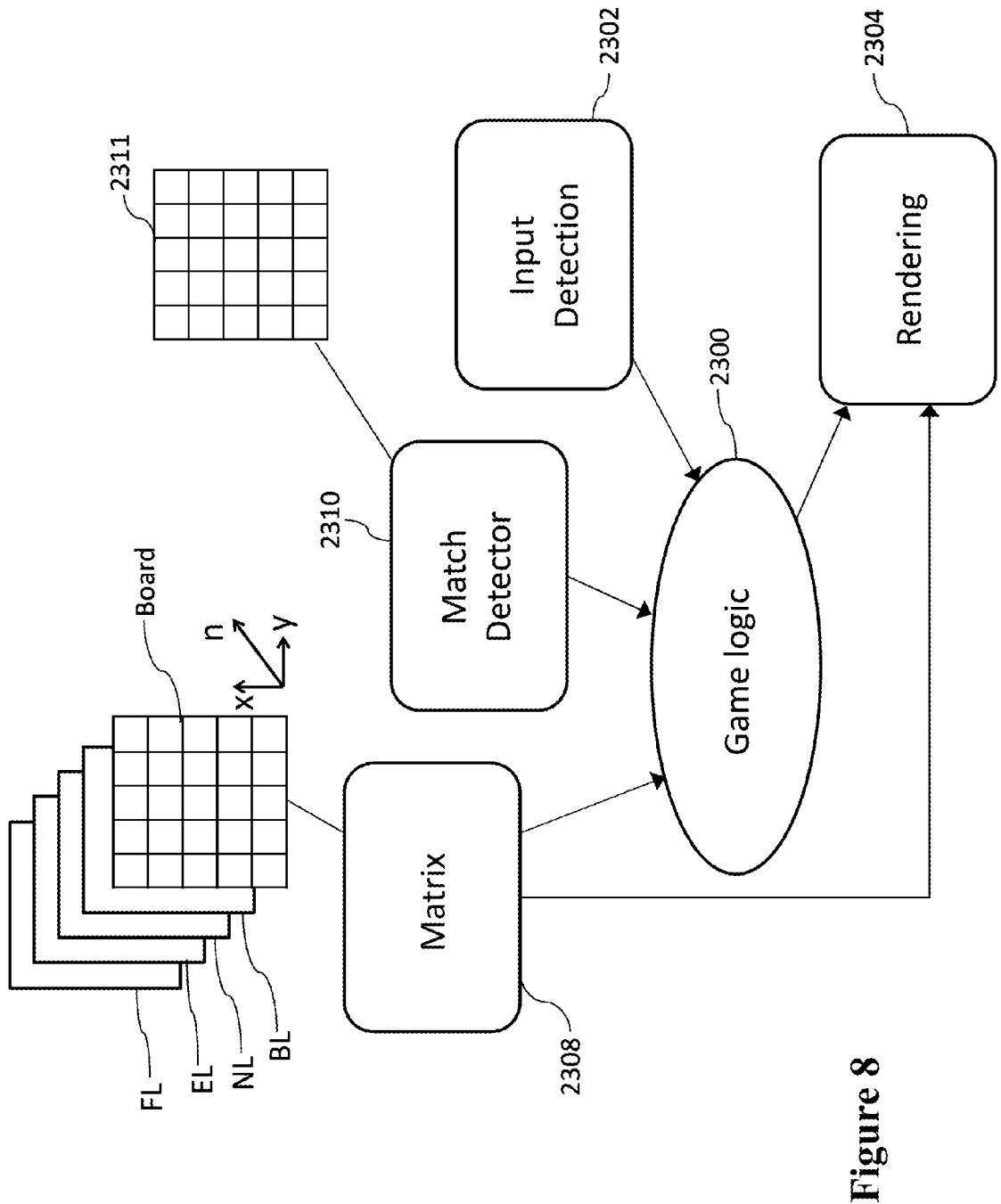
FIG. 8 is a schematic diagram of code components for controlling the display.
Figure 9:
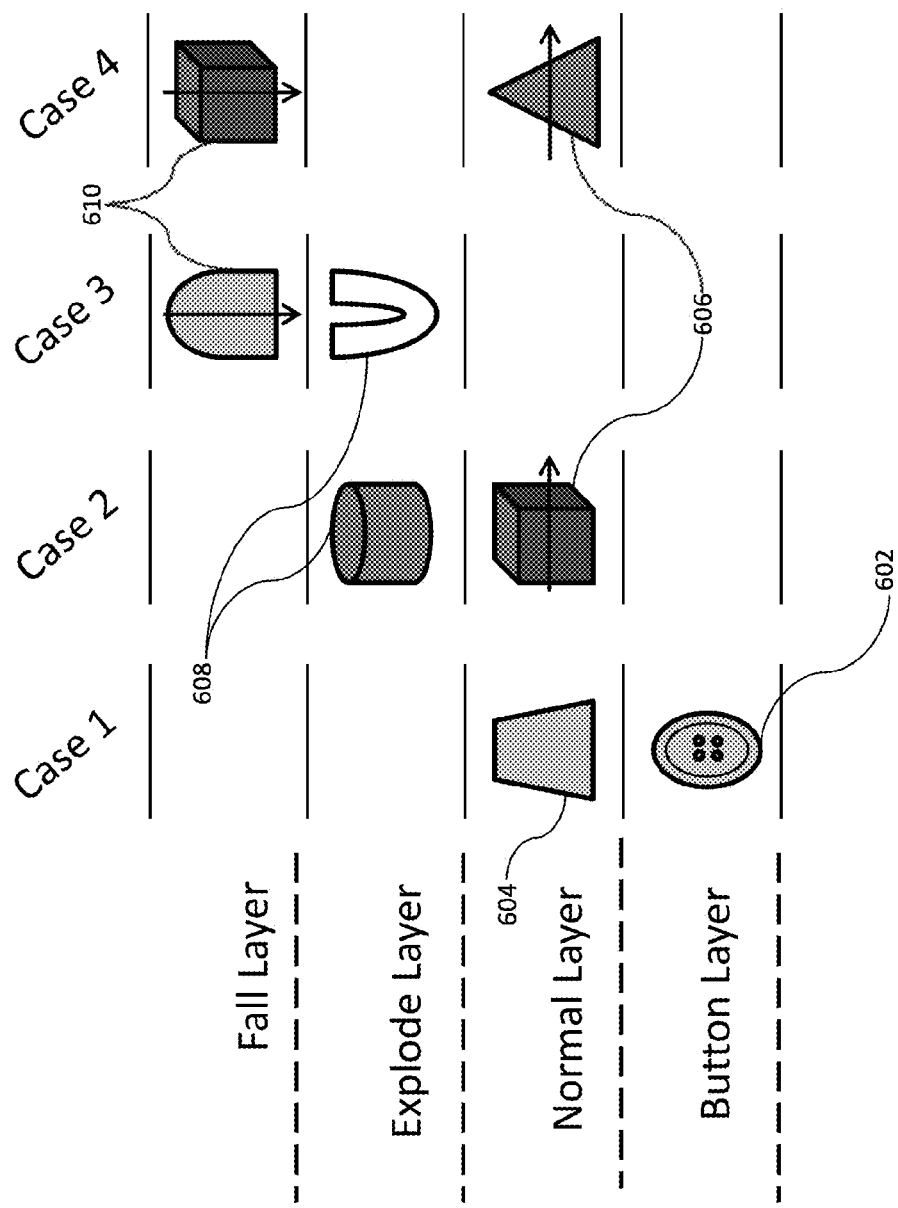
FIG. 9 illustrates the four layer data structure.

FIG. 9 is a schematic diagram showing components of software used to implement the game and control the display. The game software is executed on a processor by code stored in a memory, locally at the computer device or remotely. The game comprises a game logic component 2300 which incorporates the rules, etc. of the game. An input detection component 2302 detects user inputs by the input devices 170 to detect where a user has clicked and what action a user has just taken. A rendering component 2304 is responsible for rendering each screen after a user move, and for displaying the explosions and other animations arising in the game. The rendering component is also responsible for displaying the refill in the z-axis to animate a refill as though the plushies are arriving from above the screen to refill the game board. A matrix component 2308 stored in a memory provides a matrix representation of the game board as shown schematically in FIG. 8. In reality the matrix component can be supplied by any suitable data structure, held in local memory or remote memory accessible by the device, and is responsible for identifying for each tile location on the board information about what is to be displayed at that tile location. This information is provided to the rendering component to control the display.

In described embodiments of the present invention, the matrix 2308 is implemented as a three-dimensional grid. That is, the board is shown with two dimensions x and y, and there is a third dimension which is denoted here as dimension n (so that it does not become confused with the third dimension in the real world which is denoted z). The 'n' for dimension comprises four layers which are shown schematically in FIG. 8 and denoted a ButtonLayer BL, NormalLayer NL, ExplodeLayer EL and FallLayer FL. The NormalLayer NL of the data structure is the layer that holds data concerning the moving plushies. So referring back to FIGS. 1 through 5, the tile numbers T1, T2, etc., can be considered to represent grid positions in the NormalLayer of the data structure. The position of a game object in the data structure is either where it is or where it is going (the next tile location). When it starts to move it changes position to its destination even though it is closer to its start at that point. Obstacles (such as thimbles) are held in the grid structure in the NormalLayer.

Providing a multi-layer grid structure in the n dimension allows the display to be controlled so that the game mechanics discussed above can readily be made visible to a user in an engaging and simplified fashion.

The layers act as logical layers. The provision of the layers allow simultaneous activity at one tile. For example, there could be a button hidden in the ButtonLayer while a thimble is in the NormalLayer at the same tile position. A plushie can be moving in a tile position in the NormalLayer, while another tile is exploding at that tile position, in the ExplodeLayer. Note that when a plushie moves into a tile location occupied by another plushie of a different characteristic, this is detected in the NormalLayer. The animation of one plushie moving 'under' the adjacent plushie is effected by the rendering component. A tile can be exploding in a tile position in the ExplodeLayer while another tile is falling towards that position in the FallLayer. A plushie can be passing through a position the NormalLayer while another plushie is falling towards that tile position in the FallLayer.

To render the game board on the display of a computer device, data is extracted for each tile position from each of the four layers of the data structure and supplied to the rendering component 2304 to allow each tile position to be rendered. Thus, a tile can simultaneously show a plushie moving, another one exploding and another one falling, for example. The game logic handles these are distinct events, while the rendering component can amalgamate them to display all active functions at a particular tile location.

FIG. 9 illustrates four cases of possible game piece configurations with respect to the layers of the grid. They are each separated into a case 1-4. Case 1, there can be a button 602 hidden in 'Button Layer' while a Thimble 604 is in 'Normal Layer'. Case 2, a plushie 606 can be moving in a position in 'Normal Layer', while another plushie 608 is exploding in 'Explode Layer'. Case 3, a plushie 608 can be exploding in a position in 'Explode Layer', while another plushie 610 is falling towards that position in 'Fall Layer'. Case 4, a plushie 606 can be passing through a position in 'Normal Layer', while another plushie 610 is falling towards it in 'Fall Layer'. Note that if the thimble 604 is removed by game play, the button 602 is revealed, and the rendering component changes the graphical image on the display to change the thimble to a button at that location, although the button stays in the logical Button Layer.

Figure 10:
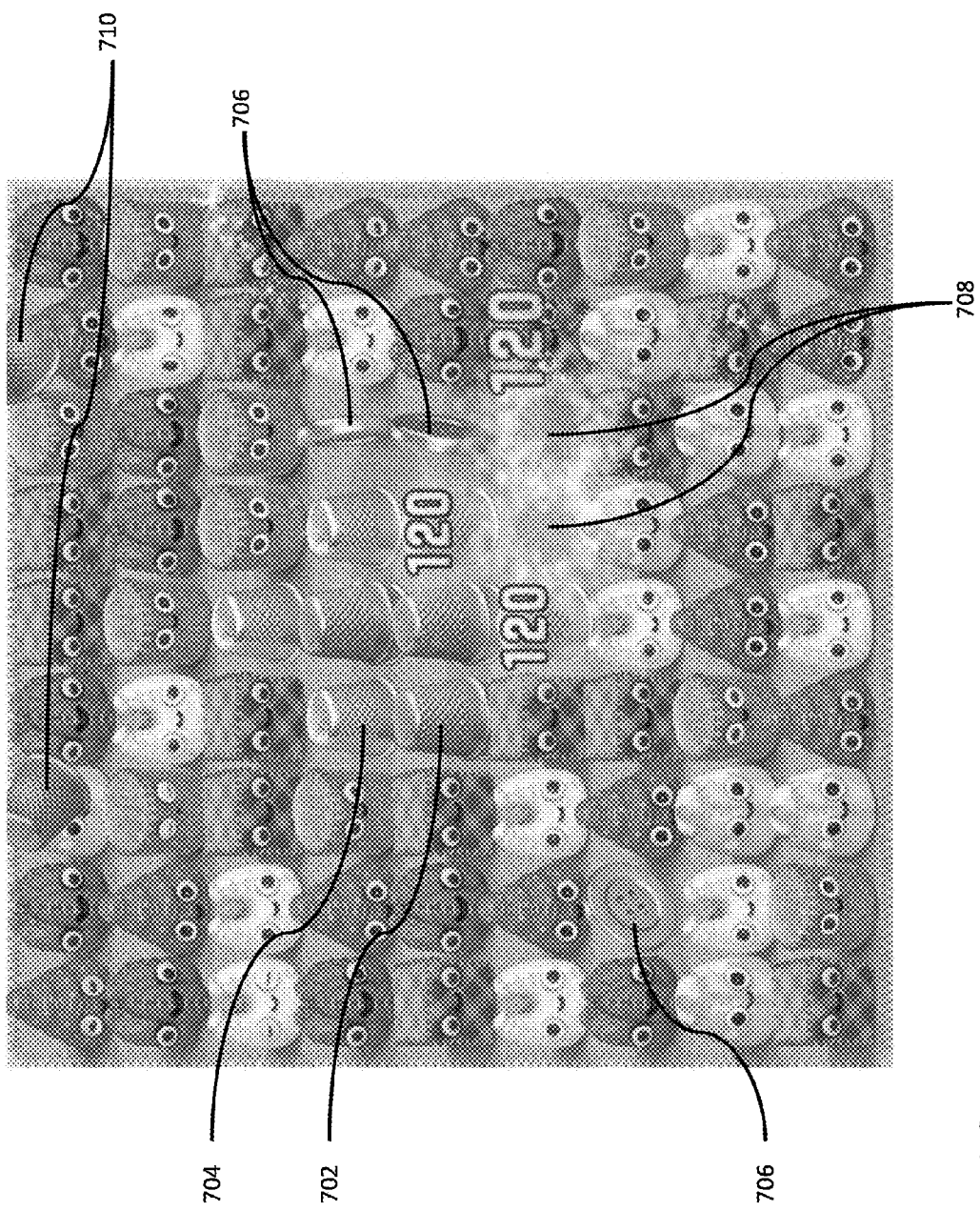
FIGS. 10 to 12 show a game board displayed to a user.

FIG. 10 shows how these four layers are presented to the player in real game play. Plushies fill the board around obstacles, in this case both bronze 702 and silver 704 thimbles. Bronze thimbles are presented as sitting over silver thimbles. Buttons 706 also occupy some tiles instead of plushies. Two explosion clouds 708 can be seen around the recently created holes in the board due to the latest move. Two bronze thimbles 710 can be seen flying out of the frame. The thimbles are thrown off the board when plushies explode next to them.

Figure 11:
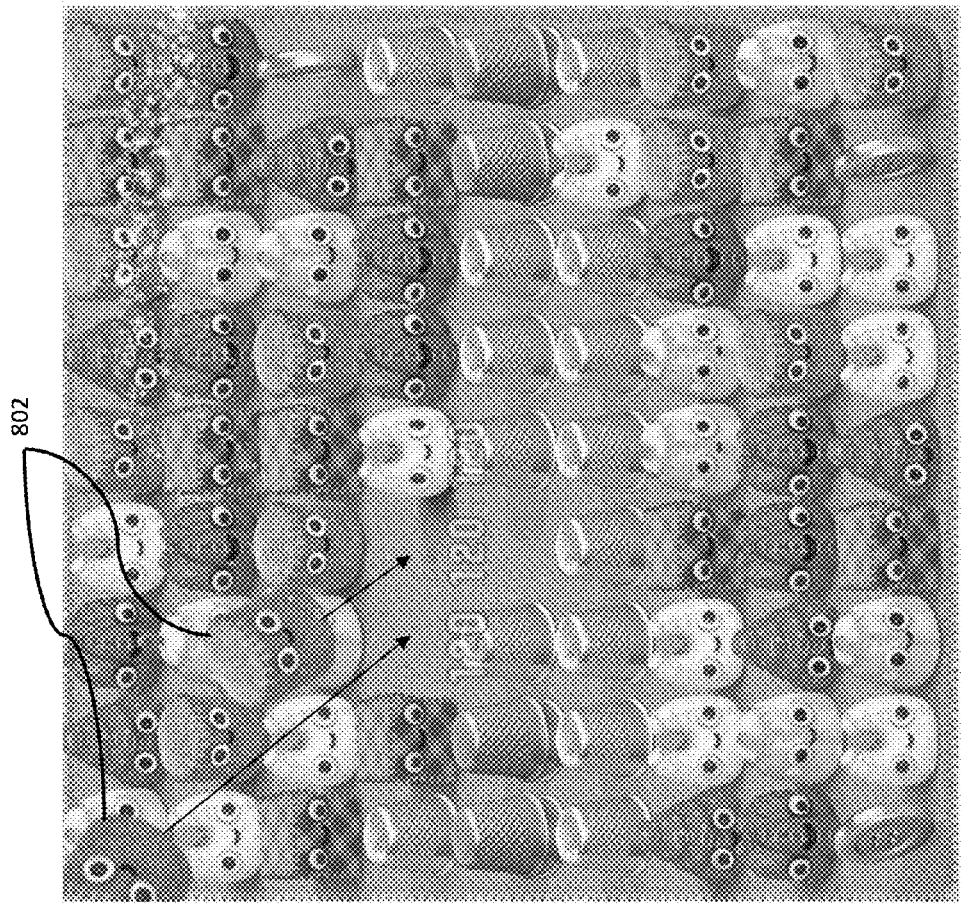

FIG. 11 shows plushies 902 falling in from the fall layer, along the z-axis, to refill the board.

Data for rendering the images on the display is managed in layers in the graphics component, to allow for the action associated with one plushie to be 'overlaid' on the action associated with another plushie in an image rendered to a user.

The main layers of the playing area from bottom to top are:

shadowLayer,
moveLayer (plushies moving below other plushies),
gridLayer (plushies, thimbles and buttons),
slideByEffectLayer (yarn animation),
combo7Layer (the plushie that grows),
trailLayer (particle effects trailing moving plushies),
genericCloudLayer (cloud particle effect after some combos),
bigCloudLayer (combo7 cloud),
colorFlightLayer (flash lightning for combo 5),
flightLayer (plushies flying off screen),
fallLayer (plushies, buttons and thimbles falling in),
buttonFlightLayer (buttons flying to GUI on the side),
scoreTrailLayer (particles flying to zipper),
scorePopLayer Some graphics are simply set to not render when below other things. i.e. buttons below thimbles.

Figure 12:
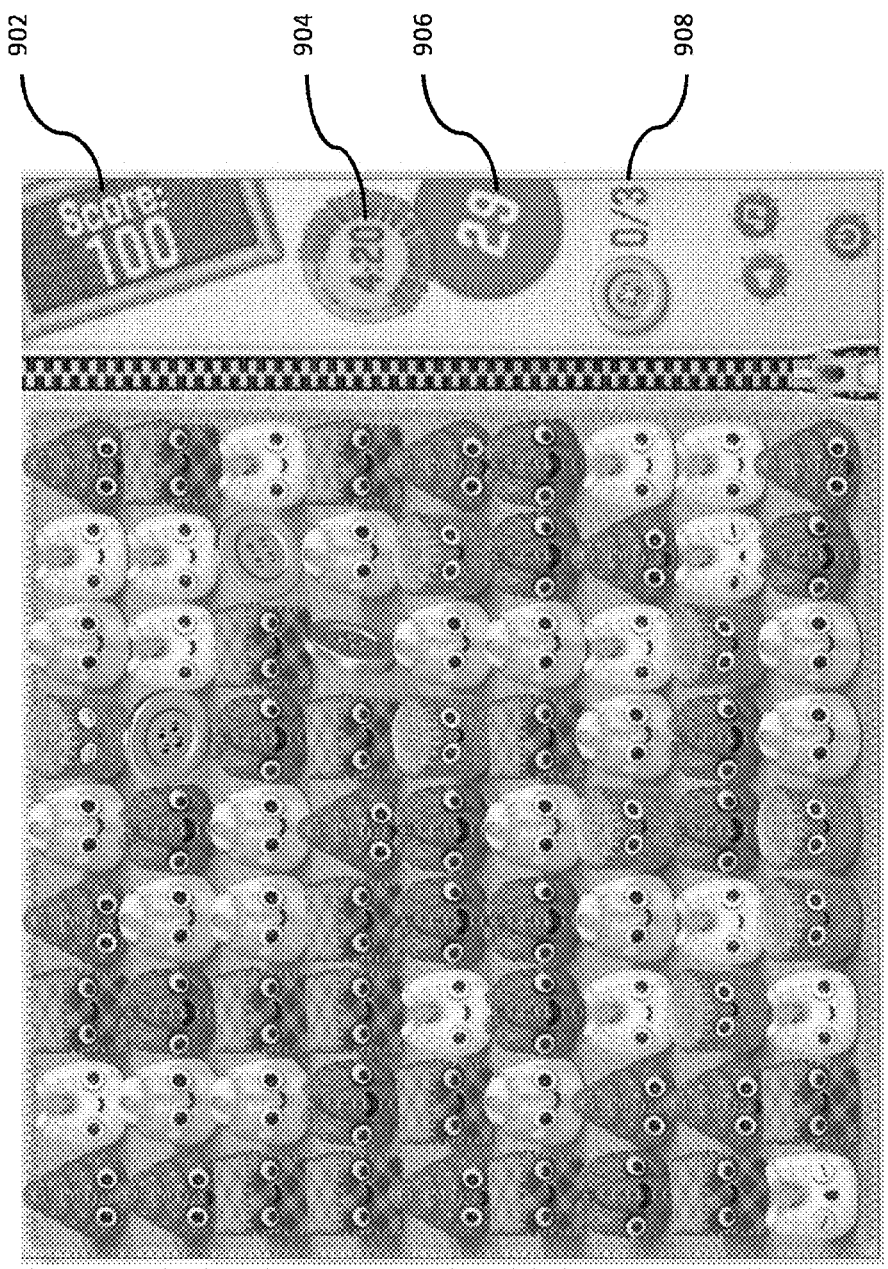

FIG. 12 shows the starting game board as well as the statistics band which is presented down the right hand side of the board. Vital information is presented to the player along the right-hand side of the screen. At the top is presented a target score 902 to complete the level. Below this is a timer 904 that counts down the total playing time remaining. Each stitch around the edge of the pink circle represents a second within the current minute. Below this is the number of remaining moves 906. Underneath this is the number of buttons collected 908 out of the total available to collect on the current level.

Figure 13:
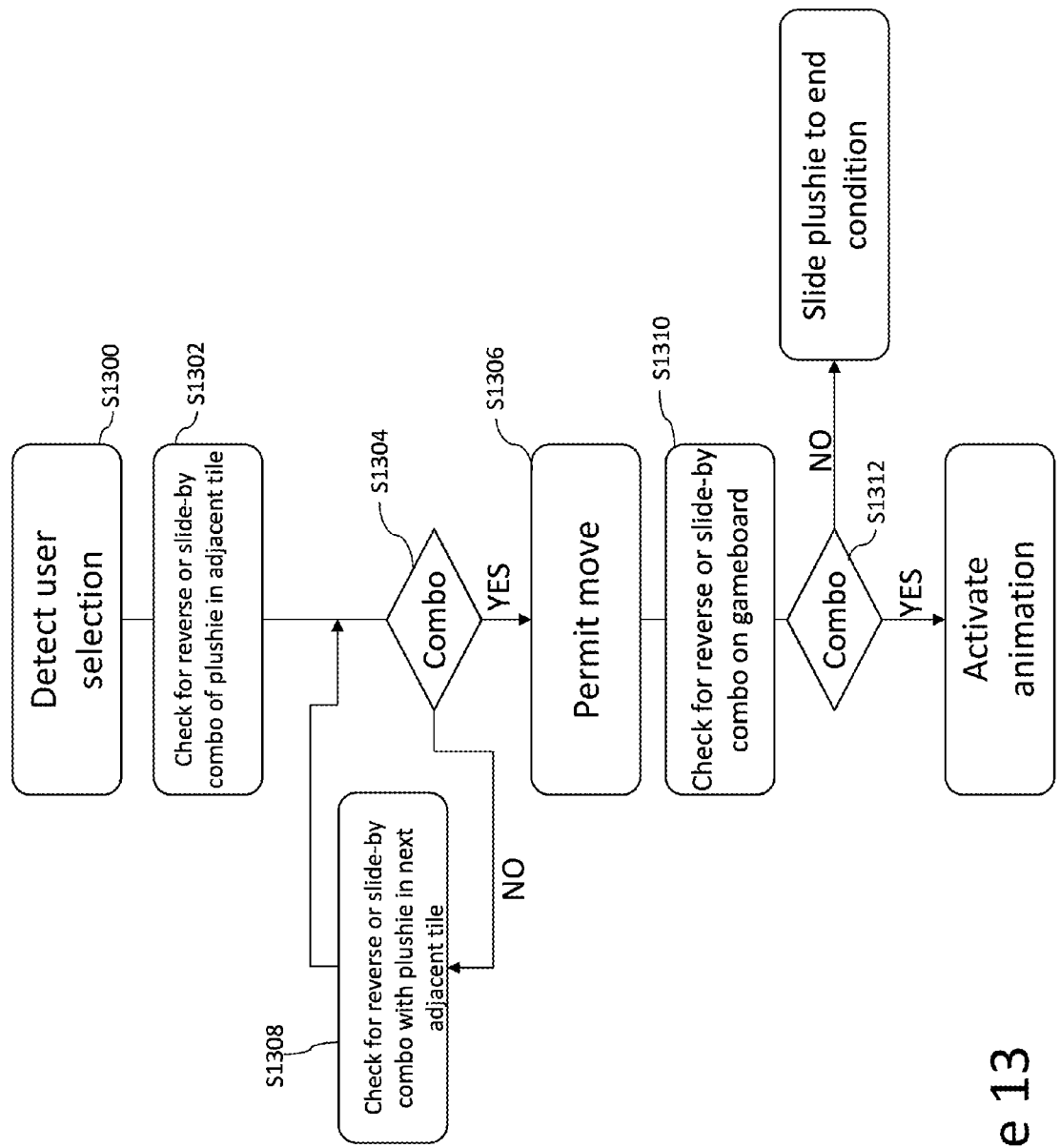
FIG. 13 is a flow chart of a match detector.

FIG. 13 illustrates a flow diagram of operation of a match detector component 2310. The match detector component 2310 has a responsibility for performing two different kinds of match checks. A match check is performed when a plushie has changed its position in a game move, and a match is also formed to test what would happen if a plushie were to move in the direction indicated by a user. The data in NormalLayer of the grid is used to detect matches. The colours of plushies in the NormalLayer of the grid are copied into a colour grid, the corresponding colour of each plushie being copied into the corresponding tile position. When a plushie has been selected, the next position (adjacent tile in the direction which has been chosen by the player) is the starting position of the check. The check is performed, detecting colour matches in and around that position. After detecting user selection of a plushie S1300, this check S1302 is carried out. When a player tries to make a move, the algorithm performs a match check for each position that the plushie would pass and all reversing moves of the plushies that it passes. If any match is detected, the algorithm will stop and the move will start. Thus, in Step S1304, a check is made to see whether any combination has resulted with the plushie in the next starting position. If a match has resulted, the move is permitted S1306. If no combination has been detected on the game board, then the position of the plushie in the next adjacent tile in the direction of the move is checked and the process repeats S1308. When the game performs a check for potential combos before allowing a plushie to move, there is no guarantee that an anticipated combo will occur. This is because other combos may have been completed in the meantime, and resulted in plushies exploding which would have been involved in the anticipated combo. Thus, after the move has been implemented, at Step S1310 checks are made again for reverse or slide by combos on the game board. If a combo is detected Step S1312, the appropriate animation is activated as described earlier. If no combination is detected, the plushie is slid to its end condition and no further action is taken. Note that the end condition could be an edge of the game board, a hole in the game board (created by removal of a plushie), an obstacle (such as a thimble) or a game object having a matching characteristic. This may mean that a plushie cannot complete a slide it has started, due to changes in the game board while it is sliding.

The invention claimed is:

1. A method of controlling a display of a computer device implemented by a processor executing computer code to cause the following steps to be carried out:
    rendering on the display a game board having a plurality of selectable game objects having respective characteristics, each at a respective tile location in an array;
    detecting a user input to select a game object to cause the game object to move in a direction, wherein when a game object is moved to an adjacent new tile location, the game object at that tile location is swapped with the selected game object;
    determining whether or not the game object can be moved in the direction by generating match data for the selected game object if moved in that direction, the match data indicating whether the move results, at any potential new tile location of the selected game object or swapped objects resulting from the move, in at least three game objects of the same characteristic occupying adjacent tile locations in the game board, and, if so, implementing the move and rendering an animation of the move on the display, wherein the selected game object slides in the direction up to a blocking condition which prevents further movement.

2. The method of claim 1, comprising storing tile data in a data structure in a memory, the tile data identifying the characteristic of each game object at the respective tile location.

3. The method of claim 2, wherein the step of generating match data comprises accessing the memory to obtain game object characteristics at a plurality of tile locations in the array; copying the characteristics into a characteristic array and searching the characteristics array for adjacent matching characteristics.

4. The method of claim 1, wherein implementing the move comprises generating further match data indicating when a match of at least three game objects occurs.

5. The method of claim 4, comprising when the move is implemented, removing from the rendered image any game objects creating a match of the at least three game objects.

6. The method of claim 5, wherein the selected game object is removed from the rendered image only when its slide has terminated at the blocking condition.

7. The method of claim 2, comprising, prior to implementing the move, altering the tile data for a potential new game board configuration resulting from the move and using the altered tile data to detect a match of at least three game objects, wherein a first such match that is detected causes the move to be implemented.

8. The method of claim 6, comprising if no such match is detected inhibiting the move and rendering an animation indicative that the game object cannot move.

9. The method of claim 8, wherein the blocking condition comprises one of:
    an edge of the game board;
    a hole in the game board; an obstacle; or
    a game object having a characteristic matching the selected game object.

10. The method of claim 5, wherein the game board is rendered on the display in two mutually perpendicular dimensions in the plane of the display wherein new game objects are generated to replace the removed game objects, and wherein a replacement step comprises rendering in the display the delivery of the new game objects in a third dimension towards the plane of the display into the tile locations of the removed game objects.

11. The method of claim 2, wherein the data structure comprises a three-dimensional array of tile data, wherein x and y dimensions correspond to x and y axis of the game board rendered on the display and a further dimension comprises a set of layers for holding tile data of different functional requirements.

12. The method of claim 11, wherein a first layer holds tile data objects in the game board array presented on the display.

13. The method of claim 12, wherein the objects include selectable game objects and obstacles.

14. The method of claim 11, wherein a second layer holds tile data for replacement game objects, wherein the replacement game objects are associated with an animation to be rendered on the display to represent falling from out of the plane of the display.

15. The method of claim 11, wherein a third layer holds tile data of game objects subject to a visual representation of an explosion.

16. The method of claim 11, wherein a fourth layer holds the data of reward objects which are not selectable and past which a game object can move to access the reward object.

17. The method of claim 10, wherein when a match of at least a predetermined number greater than three is detected, generating a zig zag booster which causes game objects arranged in a zig zag on the game board to be removed, and rendering an animation of the removal on the display.

18. The method of claim 4, wherein matches are detected for each new tile position of a game object undergoing a slide.

19. The method of claim 1, wherein generating the match data comprises, for a game object in a first tile location,
    (a) altering the tile data at the adjacent tile location in the direction of the potential move to correspond to the selected game object
    (b) altering the tile data at the first tile location to correspond to the game object at the adjacent tile location
    (c) determining in the altered tile data if there is a match of at least three game objects on the game board in any direction and generating a true or false condition,
        in the event of a false condition, repeating steps (a) to (c) for the next adjacent tile location
        in the event of true condition, implementing the move.

20. The method of claim 19, wherein the step of implementing the move comprise repeating steps (a) to (c) to identify matches in the game board configuration in which the move is implemented.

21. A computer device comprising:
a display:
a memory;
at least one processor;
and computer readable instructions which when executed on the at least one processor causes the following steps to be carried out:
- rendering on the display a game board having a plurality of selectable game objects having respective characteristics, each at a respective tile location in an array;
- detecting a user input to select a game object to cause the game object to move in a direction, wherein when a game object is moved to an adjacent new tile location, the game object at that tile location is swapped with the selected game object;
- determining whether or not the game object can be moved in the direction by generating match data for the selected game object if moved in that direction, the match data indicating whether the move results, at any potential new tile location of the selected game object or swapped objects resulting from the move, in at least three game objects of the same characteristic occupying adjacent tile locations in the game board, and, if so, implementing the move and rendering an animation of the move on the display, wherein the selected game object slides in the direction up to a blocking condition which prevents further movement.

22. A non-transitory computer readable medium having instructions which when executed by a processor implement a method of controlling a display of a computer device comprising:
- rendering on the display a game board having a plurality of selectable game objects having respective characteristics, each at a respective tile location in an array;
- detecting a user input to select a game object to cause the game object to move in a direction, wherein when a game object is moved to an adjacent new tile location, the game object at that tile location is swapped with the selected game object;
- determining whether or not the game object can be moved in the direction by generating match data for the selected game object if moved in that direction, the match data indicating whether the move results, at any potential new tile location of the selected game object or swapped objects resulting from the move, in at least three game objects of the same characteristic occupying adjacent tile locations in the game board, and, if so, implementing the move and rendering an animation of the move on the display, wherein the selected game object slides in the direction up to a blocking condition which prevents further movement.

23. A method of generating data to control a display of a computer device implemented by a processor executing computer code to cause the following steps to be carried out:
- generating data to render on the display a game board having a plurality of selectable game objects having respective characteristics, each at a respective tile location in an array;
- detecting a user input to select a game object to cause the game object to move in a direction, wherein when a game object is moved to an adjacent new tile location, the game object at that tile location is swapped with the selected game object;
- determining whether or not the game object can be moved in the direction by generating match data for the selected game object if moved in that direction, the match data indicating whether the move results, at any potential new tile location of the selected game object or swapped objects resulting from the move, in at least three game objects of the same characteristic occupying adjacent tile locations in the game board, and, if so, implementing the move and causing the rendering of an animation of the move on the display, wherein the selected game object slides in the direction up to a blocking condition which prevents further movement.

* * * * *